United States Patent
Hoover et al.

(10) Patent No.: US 8,791,972 B2
(45) Date of Patent: Jul. 29, 2014

(54) REFLEX-TYPE DIGITAL OFFSET PRINTING SYSTEM WITH SERIALLY ARRANGED SINGLE-PASS, SINGLE-COLOR IMAGING SYSTEMS

(75) Inventors: Martin E. Hoover, Rochester, NY (US); Peter Paul, Webster, NY (US); James D. Shoots, Victor, NY (US); Jess R. Gentner, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 302 days.

(21) Appl. No.: 13/372,460

(22) Filed: Feb. 13, 2012

(65) Prior Publication Data

US 2013/0208304 A1    Aug. 15, 2013

(51) Int. Cl.
| | |
|---|---|
| *B41J 2/435* | (2006.01) |
| *G03B 27/54* | (2006.01) |
| *B41L 17/08* | (2006.01) |
| *G02B 26/08* | (2006.01) |

(52) U.S. Cl.
CPC ............ *B41L 17/08* (2013.01); *G02B 26/0833* (2013.01)
USPC ............................................ 347/224; 355/67

(58) Field of Classification Search
CPC ............................. G02B 26/0833; B41L 17/08
USPC ....................... 347/224; 355/47, 67; 358/1.15
See application file for complete search history.

(56) References Cited

U.S. PATENT DOCUMENTS

| | | |
|---|---|---|
| 3,800,699 A | 4/1974 | Carley |
| 5,041,851 A | 8/1991 | Nelson |
| 5,101,236 A | 3/1992 | Nelson et al. |
| 5,105,207 A | 4/1992 | Nelson |
| 5,105,369 A | 4/1992 | Nelson |
| 5,151,718 A | 9/1992 | Nelson |
| 5,500,670 A | 3/1996 | Ang et al. |
| 5,563,398 A | 10/1996 | Sampsell |
| 5,719,682 A | 2/1998 | Venkateswar |
| 5,721,622 A | 2/1998 | Venkateswar |
| 5,754,217 A | 5/1998 | Allen |
| 5,953,152 A | 9/1999 | Hewlett |
| 5,954,424 A | 9/1999 | Anderson et al. |
| 5,997,150 A | 12/1999 | Anderson |

(Continued)

FOREIGN PATENT DOCUMENTS

| | | |
|---|---|---|
| EP | 0957384 A2 | 11/1999 |
| EP | 1155865 A2 | 11/2001 |
| EP | 1327527 A1 | 7/2003 |
| WO | 2006/083004 A2 | 8/2006 |

*Primary Examiner* — Laura Martin
*Assistant Examiner* — Carlos A Martinez
(74) *Attorney, Agent, or Firm* — Bever, Hoffman & Harms, LLP; Patrick T. Bever

(57) ABSTRACT

A reflex-type digital offset printing system includes four single-pass, single-color digital imaging systems arranged along a print medium feed path, and an image server that utilizes a positional clock to implicitly synchronize the imaging systems with the movement of a print medium along the feed path such that single-color (e.g., black, cyan, magenta, or yellow) image portions can be successively superimposed to produce a full color image. Each single-color digital imaging system utilizes a digital micromirror device and an anamorphic imaging system to generate a high energy, one-dimensional modulated line image that selectively evaporates fountain solution from an imaging cylinder before ink material is applied. Each imaging system utilizes a sensor that sends a respective drum position signal to the image server, and the image server utilizes the drum position signals to synchronize the single-color printing operations with the position of the printing medium.

15 Claims, 11 Drawing Sheets

(56) References Cited

U.S. PATENT DOCUMENTS

| | | |
|---|---|---|
| 6,121,984 A | 9/2000 | Anderson |
| 6,529,261 B2 | 3/2003 | Shinada |
| 6,552,777 B2 | 4/2003 | Sunagawa |
| 6,567,217 B1 | 5/2003 | Kowarz et al. |
| 6,606,739 B2 | 8/2003 | Kanatake et al. |
| 6,724,546 B2 | 4/2004 | Nishimae et al. |
| 7,048,388 B2 | 5/2006 | Takaura et al. |
| 7,154,640 B2 | 12/2006 | Ishihara |
| 7,218,380 B2 | 5/2007 | De Jager |
| 7,508,570 B1 | 3/2009 | Meisburger |
| 8,031,390 B2 | 10/2011 | Grasser et al. |
| 8,104,901 B2 | 1/2012 | Kwon |
| 8,199,178 B1 | 6/2012 | Payne |
| 8,282,221 B2 | 10/2012 | Arai et al. |
| 8,520,045 B2 | 8/2013 | Maeda |
| 2002/0044265 A1* | 4/2002 | Sumi ................ 355/47 |
| 2002/0140801 A1 | 10/2002 | Kubota |
| 2002/0171878 A1 | 11/2002 | Nakajima |
| 2004/0190573 A1 | 9/2004 | Kruschwitz et al. |
| 2008/0055391 A1 | 3/2008 | Sakamoto et al. |
| 2008/0062390 A1 | 3/2008 | Zhang et al. |
| 2010/0165426 A1 | 7/2010 | Kihara et al. |
| 2010/0208329 A1 | 8/2010 | Sandstrom et al. |
| 2013/0050669 A1* | 2/2013 | Maeda ................ 355/67 |

* cited by examiner

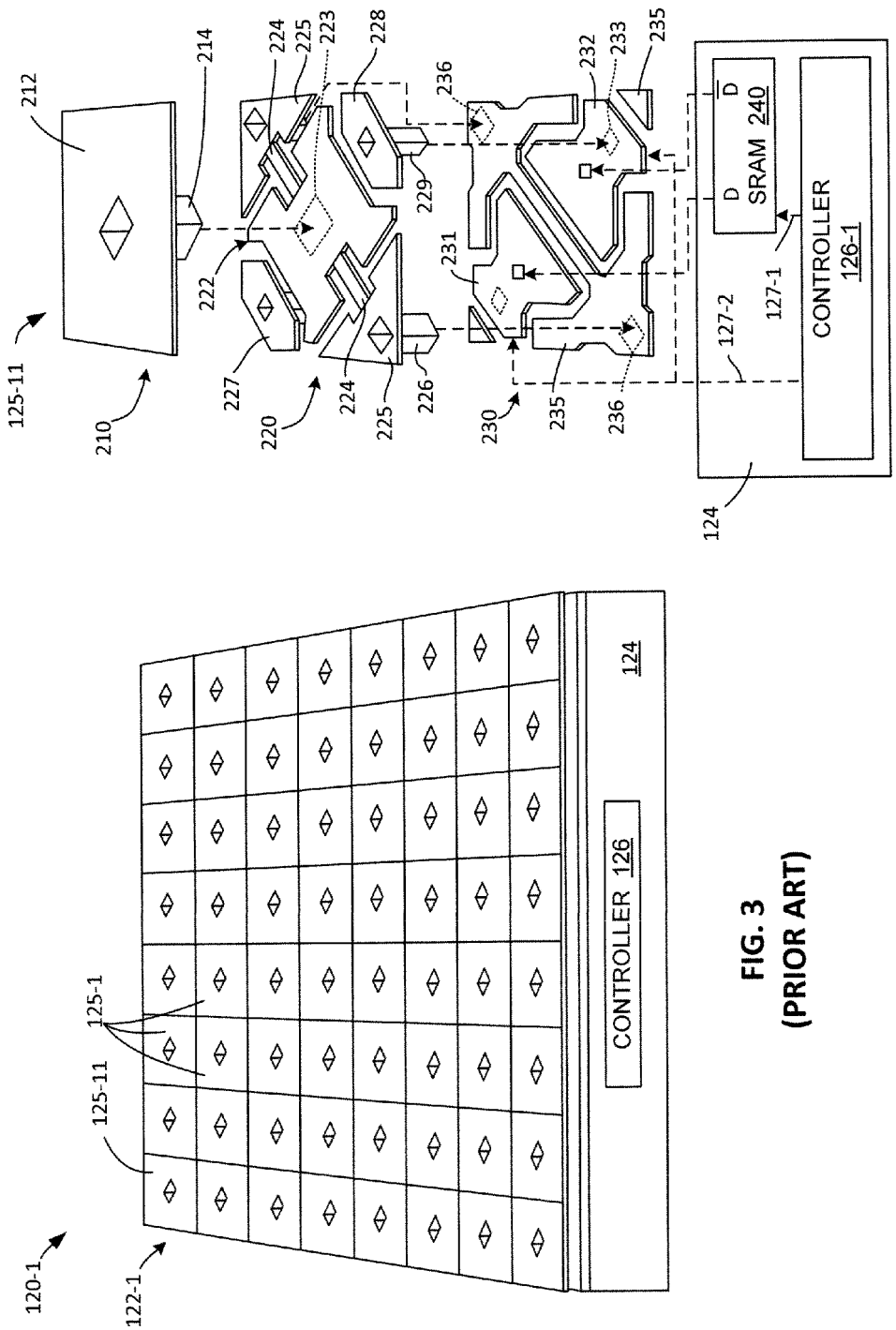

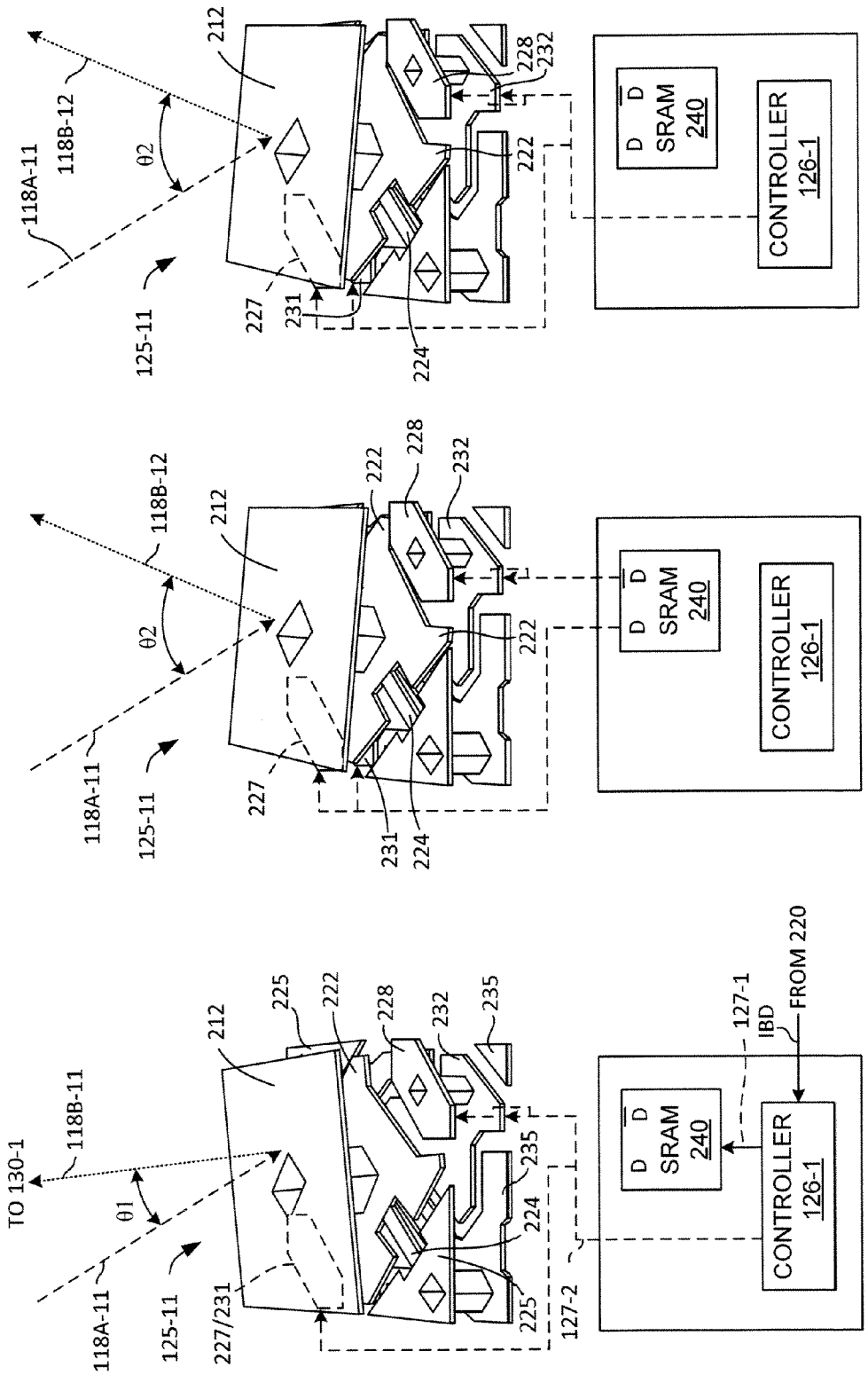

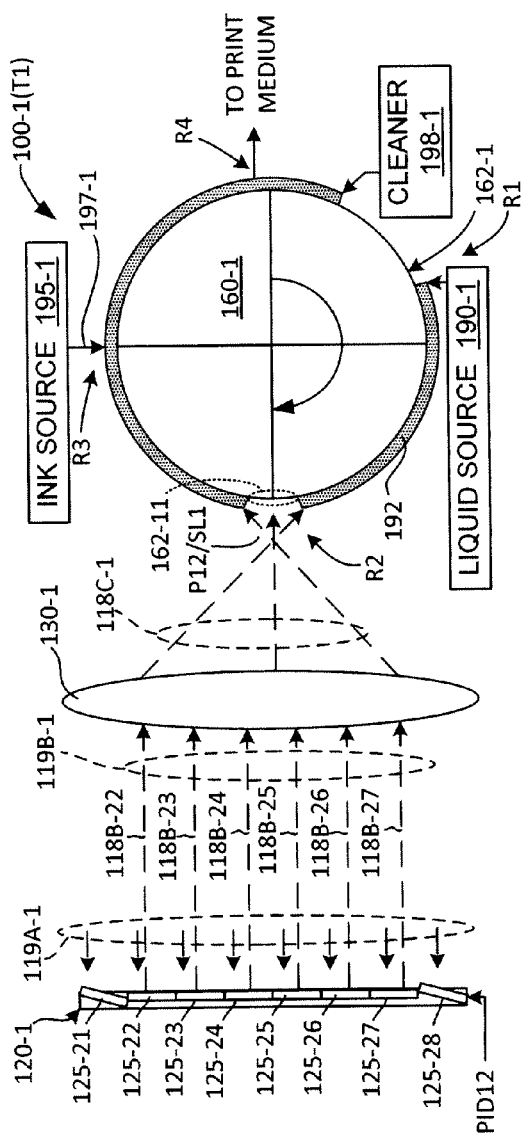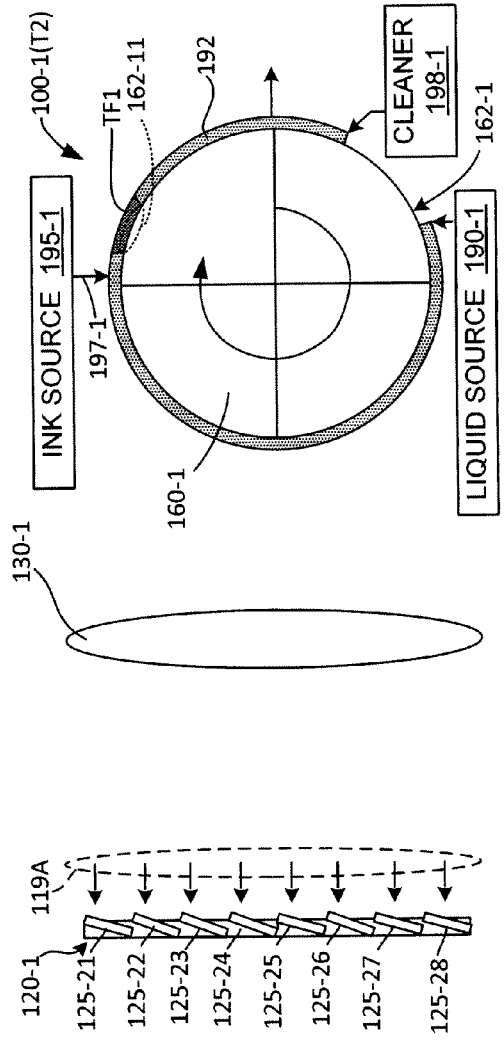
FIG. 7(A)
FIG. 7(B)

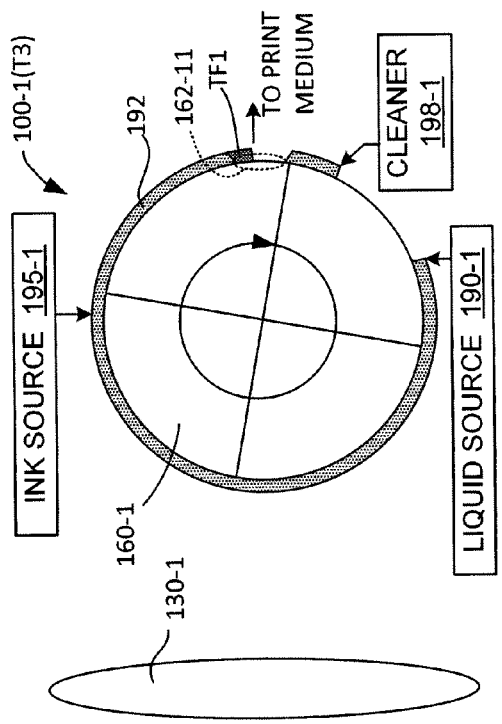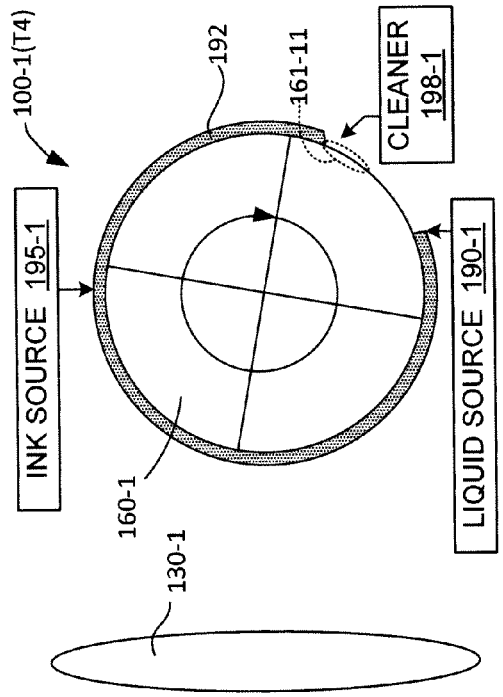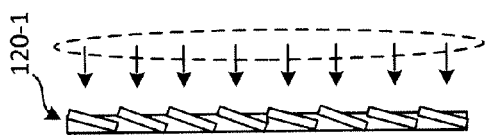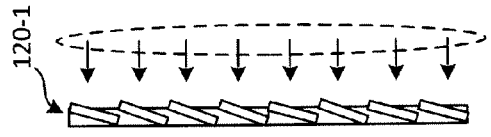
FIG. 7(C)
FIG. 7(D)

REFLEX-TYPE DIGITAL OFFSET PRINTING SYSTEM WITH SERIALLY ARRANGED SINGLE-PASS, SINGLE-COLOR IMAGING SYSTEMS

FIELD OF THE INVENTION

This invention relates to digital offset printer systems, and in particular to color printers having single-pass imaging systems that utilize high energy light sources for high speed image transfer operations.

BACKGROUND OF THE INVENTION

Laser imaging systems are extensively used to generate images in applications such as xerographic printing, mask and maskless lithographic patterning, laser texturing of surfaces, and laser cutting machines. Laser printers often use a raster optical scanner (ROS) that sweeps a laser perpendicular to a process direction by utilizing a polygon or galvo scanner, whereas for cutting applications laser imaging systems use flatbed x-y vector scanning.

One of the limitations of the laser ROS approach is that there are design tradeoffs between image resolution and the lateral extent of the scan line. These tradeoffs arising from optical performance limitations at the extremes of the scan line such as image field curvature. In practice, it is extremely difficult to achieve 1200 dpi resolution across a 20" imaging swath with single galvanometers or polygon scanners. Furthermore, a single laser head motorized x-y flatbed architecture, ideal for large area coverage, is too slow for most high speed printing processes.

For this reason, monolithic light emitting diode (LED) arrays of up to 20" in width have an imaging advantage for large width xerography. Unfortunately, present LED arrays are only capable of offering 10 milliWatt power levels per pixel and are therefore only useful for some non-thermal imaging applications such as xerography. In addition, LED bars have differential aging and performance spread. If a single LED fails it requires the entire LED bar be replaced. Many other imaging or marking applications require much higher power. For example, laser texturing, or cutting applications can require power levels in the 10 W-100 W range. Thus LED bars can not be used for these high power applications. Also, it is difficult to extend LEDs to higher speeds or resolutions above 1200 dpi without using two or more rows of staggered heads.

Higher power semiconductor laser arrays in the range of 100 mW-100 Watts do exist. Most often they exist in a 1D array format such as on a laser diode bar often about 1 cm in total width. Another type of high power directed light source are 2D surface emitting VCSEL arrays. However, neither of these high power laser technologies allow for the laser pitch between nearest neighbors to be compatible with 600 dpi or higher imaging resolution. In addition, neither of these technologies allow for the individual high speed control of each laser. Thus high power applications such as high power overhead projection imaging systems, often use a high power source such as a laser in combination with a spatial light modulator such as a DLP™ chip from Texas Instruments or liquid crystal arrays.

Prior art has shown that if imaging systems are arrayed side by side, they can be used to form projected images that overlap wherein the overlap can form a larger image using software to stitch together the image patterns into a seamless pattern. This has been shown in many maskless lithography systems such as those for PC board manufacturing as well as for display systems. In the past such arrayed imaging systems for high resolution applications have been arranged in such a way that they must use either two rows of imaging subsystems or use a double pass scanning configuration in order to stitch together a continuous high resolution image. This is because of physical hardware constraints on the dimensions of the optical subsystems. The double imaging row configuration can still be seamlessly stitched together using a conveyor to move the substrate in single direction but such a system requires a large amount of overhead hardware real estate and precision alignment between each imaging row.

For the maskless lithography application, the time between exposure and development of photoresist to be imaged is not critical and therefore the imaging of the photoresist along a single line does not need be exposed at once. However, sometimes the time between exposure and development is critical. For example, xerographic laser printing is based on imaging a photoreceptor by erasing charge which naturally decays over time. Thus the time between exposure and development is not time invariant. In such situations, it is desirable for the exposure system to expose a single line, or a few tightly spaced adjacent lines of high resolution of a surface at once.

In addition to xerographic printing applications, there are other marking systems where the time between exposure and development are critical. One example is the laser based variable data lithographic marking approach originally disclosed by Carley in U.S. Pat. No. 3,800,699 entitled, "FOUNTAIN SOLUTION IMAGE APPARATUS FOR ELECTRONIC LITHOGRAPHY". In standard offset lithographic printing, a static imaging plate is created that has hydrophobic imaging and hydrophilic non-imaging regions. A thin layer of water based dampening solution selectively wets the plate and forms an oleophobic layer which selectively rejects oil-based inks. In variable data lithographic marking disclosed in U.S. Pat. No. 3,800,699, a laser can be used to pattern ablate the fountain solution to form variable imaging regions on the fly. For such a system, a thin layer of dampening solution also decays in thickness over time, due to natural partial pressure evaporation into the surrounding air. Thus it is also advantageous to form a single continuous high power laser imaging line pattern formed in a single imaging pass step so that the liquid dampening film thickness is the same thickness everywhere at the image forming laser ablation step. However, for most arrayed high power high resolution imaging systems, the hardware and packaging surrounding a spatial light modulator usually prevent a seamless continuous line pattern to be imaged. Furthermore, for many areas of laser imaging such as texturing, lithography, computer to plate making, large area die cutting, or thermal based printing or other novel printing applications, what is needed is laser based imaging approach with high total optical power well above the level of 1 Watt that is scalable across large process widths in excess of 20" as well as having achievable resolution greater than 1200 dpi and allows high resolution high speed imaging in a single pass.

Traditional offset printing relies on high quality two dimensional image plates that are attached to printing cylinders that provide good single color pixel registration and consistent single color image dimensions, and that all run in lock step to provide good color-to-color image registration. A similar mechanism is required to produce a digital offset printing system that exhibits consistent and accurate single color pixel placement in order to provide good color-to-color image registration. One conventional digital offset printing system uses a high power laser based imager whose linear beam is reflected with sub-pixel spatial control onto sequentially arranged single-color imaging cylinders (drums) to form single-color two-dimensional images, which are then superimposed to produce the desired full color image. However, laser based digital offset imaging systems have a problem in that the imaging cylinders typically experience uncontrollable motion errors when forming each of the multiple single-color two dimensional images, resulting in the light energy from the laser beam reflected with sub-pixel spatial control landing on the imaging cylinder with spatial displacement errors. These motion errors generate small random displacements of the single color image "pixels" that, when superimposed to form the full color image, cause unacceptable color-to-color image registration errors that produce blurred images.

What is needed is a digital offset printing system that provides similar function to that of traditional offset printing systems to enable digital offset printing with acceptable color image registration.

SUMMARY OF THE INVENTION

The present invention is directed to a reflex-type digital offset printing system in which multiple (e.g., four) single-pass, single-color digital imaging systems are arranged in series along a print medium feed path, and a system controller (image server) utilizes a positional clock to synchronize the operation of each single-color digital imaging system with the movement of a print medium along the feed path such that single-color (e.g., black, cyan, magenta, or yellow) image portions generated by the respective single-color digital imaging systems are successively transferred in a superimposed manner onto the print medium to produce a full color image. Each single-color digital imaging system utilizes a digital micromirror device (DMD) (or other two-dimensional spatial light modulator) and an anamorphic imaging system to generate a high energy, one-dimensional line image that is modulated in accordance with image data in order to selectively evaporate a fountain solution from an associated imaging cylinder (drum roller) prior to the application of a single-color ink (e.g., black, cyan, magenta, or yellow) material in order to generate one of the single-color image portions, which are then sequentially transferred either directly in a superimposed manner or indirectly (e.g., by way of an imaging blanket) onto the print medium to produce the full color image.

In accordance with an embodiment of the present invention, each single-color digital imaging system utilizes a drum position/motion sensor that sends a respective drum position signal to the image server, and the image server utilizes the drum position signals to synchronize the single-color printing operations with the position of the imaging drum, and thus implicitly, with the position of the printing medium in the print medium feed path. In one embodiment, each drum position/motion sensor is implemented by a rotary shaft encoder or surface motion encoder that serves to accurately measure the displacement of the imaging cylinder (drum) surface as it moves under the focal line of the imaging system. The drum position signal generated by each position/motion sensor is utilized by the image server to synchronize the operation of each DMD with the actual drum surface position of each imaging system in order to correct for manufacturing defects (e.g., out-of-round drum cylinder defects or drive-train gear defects) that can create undesirable variances in the process direction pixel spacing. In this way, registration of the single-color images across the print medium (image area) is made possible by providing consistent pixel placement of each color separation onto the respective color imaging cylinder (drum), which further enables digital offset printing with acceptable color image registration. In one embodiment an index is read from each imaging cylinder that provides a once per revolution reference point such that reflex correction profiles can be implemented to correct for runout or eccentricity errors and to provide repeatable location of each color image on the respective imaging cylinders. By enabling synchronization of DMD operation with the actual drum surface position in each single-color digital imaging system, the present invention facilitates a convenient software-based method for calibrating each digital imaging system to correct for each system's unique manufacturing errors. This feature can be beneficially utilized in monochrome printer systems as well as in the full-color system described with reference to the main embodiment of the present invention. The reflex correction profile may be determined by printing a specific image pattern relative to the once per revolution reference point, such a series of line segments known in the art as a "ladder chart", and measuring each line segment displacement on the print medium using an inline or off line document scanner or digital camera and known image processing analytic techniques to locate centroids of the line segments. This process to determine the reflex correction profile relative to the once per revolution reference point can be performed periodically to account of degradation in the system components to address errors that change with time.

According to an aspect of the present invention, the DMD of each single-color imaging systems (or any alternative spatial light modulator, such as an electro-optic diffractive modulator arrays or an array of thermo-optic absorber elements) includes a two-dimensional array of individually controllable microelectromechanical (MEMs) mirror mechanisms (or other light modulating elements) disposed on a substrate that are configured in accordance with image data to generate a two-dimensional modulated light field that is passed to an associated anamorphic optical system. According to an embodiment of the present invention, each DMD is implemented using a commercially available digital micromirror device (DMD) device such as a DLP™ chip from Texas Instruments, referred to as a Digital Light Processor or Digital Micromirror Device (DMD) in the packaged form, and is maintained in a folded arrangement relative to an associated light source and an associated anamorphic imaging system. Each MEMs mirror mechanism includes a mirror (light modulating element) that is movably supported between first ("on") and second ("off") tilted positions according to associated control signals generated by a controller. Each DMD also includes a control circuit having memory cells that store image data for individually controlling the modulated state of each mirror. Depending on the data stored in its associated memory cell, each mirror is adjustable between an "on" (first) modulated state and "off" (second) modulated state. When the MEMs mirror mechanism is in the "on" (first) modulated state, its mirror is pivoted into a first tilted position in which the mirror reflects its associated received light portion at a first angle toward the associated anamorphic optical system. Conversely, when the MEMs mirror mechanism is in the "off" (second) modulated state, the mirror is pivoted into a second tilted position in which the mirror reflects the associated received light portion at a second angle away from the anamorphic optical system towards a beam dump (heat sink). By modulating homogenous light in this manner prior to being anamorphically projected and concentrated, the present invention is able to produce a high power (scan-like) line image along the entire line image region simultaneously, as compared with a rastering system that only applies high power to one point of a scan line at any given instant. In addition, because the relatively low power homogenous light is spread over the large number of modulating elements, the present invention can be produced using low-cost, commercially available spatial light modulating devices, such as digital micromirror (DMD) devices, electro-optic diffractive modulator arrays, or arrays of thermo-optic absorber elements.

According to an embodiment of the present invention, the arrayed MEMS mirror elements of the DMD are arranged in rows and columns, and the anamorphic optical system is arranged to concentrate light portions received from each column of MEMS mirror elements onto an associated imaging "pixel" region of the generated elongated line image (i.e., such that the numerous image pixel "dots" are arranged in the cross-process direction). That is, the concentrated modulated light portions received from all of the MEMS mirror elements in a given column (and in the "on" modulated state) are directed by the anamorphic optical system onto the same corresponding image pixel region of the line image so that the resulting image "pixel" (dot) is the composite light from all MEMS mirror elements in the given column that are in the "on" state. A key aspect of the present invention lies in understanding that the light portions passed by each "on" MEMS mirror element represents one pixel of binary data that is delivered to the line image by the anamorphic optical system, so that the brightness of each image "pixel" making up the line image is controlled by the number of elements in the associated column that are in the "on" state. Accordingly, by individually controlling the multiple mirror elements disposed in each column, and by concentrating the light passed by each column onto a corresponding imaging region, each single-color imaging system has gray-scale capabilities using constant (non-modulated) homogenous light. In addition, if the position of a group of "on" pixels in each column is adjusted up or down the column, this arrangement facilitates software electronic compensation of bow (i.e. "smile" of a straight line) and skew.

According to an embodiment of the present invention, the anamorphic optical system of each single-color optical system includes a cross-process optical subsystem and a process-direction optical subsystem that concentrate the modulated light portions received from the spatial light modulator such that the concentrated modulated light forms the corresponding substantially one-dimensional scan line image, wherein the concentrated modulated light at the line image has a higher optical intensity (i.e., a higher flux density) than that of the homogenized light. By anamorphically concentrating (focusing) the two-dimensional modulated light pattern to form a high energy elongated scan line, the imaging system of the present invention outputs a higher intensity scan line. The scan line image is formed, for example, using different pairs of cylindrical or acylindrical lens that address the converging and tight focusing of the scan line image along the cross-process direction and the projection and magnification of the scan line image along the cross-process direction. In one specific embodiment, the cross-process optical subsystem includes first and second cylindrical or acylindrical lenses arranged to project and magnify the modulated light onto the elongated scan line in a cross-process direction, and the process-direction optical subsystem includes a third cylindrical or acylindrical focusing lens arranged to concentrate and demagnify the modulated light on the scan line in a direction parallel to a process direction. It should be understood that the overall optical system may have several more elements to help compensate for optical aberrations or distortions and that such optical elements may be transmissive lenses or reflective mirror lenses with multiple folding of the beam path.

According to another aspect of the present invention, the liquid source, the anamorphic optical system and the ink source are positioned such that the fountain solution is continuously applied onto the outer imaging surface at a first (e.g. lower) radial position relative to the rotating imaging cylinder, the ink material is continuously applied onto the outer imaging surface at a second (e.g., upper) radial position of the imaging cylinder that is downstream in the rotating direction from the liquid source, and the concentrated modulated light is applied to the elongated scanning region at a third (e.g., front middle) radial position of the imaging cylinder that is between the first and second radial positions. The concentrated modulated light generated by the DMD and associated anamorphic optical system of each single-color imaging system is utilized to remove (evaporate) a fountain disposed on an outer (imaging) surface of the imaging cylinder in order to facilitate patterning of the ink material, which is formulated to adhere only to exposed portions of the imaging surface (i.e., portions from which the fountain solution is removed by said concentrated modulated light), whereby the adhered ink material forms a patterned single-color image portion on the imaging surface. The single-color image portion is subsequently transferred to the print medium at a fourth (e.g., rear middle) radial location that is downstream from the ink source.

According to yet another embodiment of the present invention, four single-color imaging systems are arranged in series along the print medium feed path such that black, cyan, magenta, and yellow ink materials are sequentially transferred onto the print medium as it travels along the print medium feed path. During this print operation the system server (controller) synchronizes the operation of each single-color imaging systems using the position/motion sensors to accurately measure the displacement of the imaging surface of each imaging cylinder. Reflex clocks are generated at the appropriate line clock rate for imaging resolution that also track the motion of the imaging cylinders such that the images formed on the imaging cylinders has accurate line scan positioning (spatial imaging) across the imaging surface. Reflex clock for each color printing station is generated at a higher frequency than the line scan imager line clock rate. Printing of each image is done by positional displacement along the process direction of the imaging cylinder. Individual print head delays are used as actuators to delay a divided down reflex clock to each head module. This allows sub-pixel adjustment of each head timing to align or Y stitch the timing of the linear array of imaging modules such that the placement of pixels being written by the multiple heads are co-linear in the resulting image on the drum.

According to another aspect of the present invention, the imaging system architecture provides consistent and accurate stitching across a linear array of high power imaging head modules. According to another embodiment of the invention, each single-color imaging system includes multiple DMDs (spatial light modulators), and further includes an image stitching controller that serves to electronically stitch the anamorphically imaged and concentrated light fields generate by each DMD such that the line image is seamlessly produced in the imaging region of the imaging cylinder. In one embodiment, the electronic stitching involves separating the single-color image data received from the system controller, which represents an entire line image to be generated, into groups of modified image data that are respectively transmitted to each DMD such that the resulting scan line portions form a seamless scan line image in the imaging region.

BRIEF DESCRIPTION OF THE DRAWINGS

These and other features, aspects and advantages of the present invention will become better understood with regard to the following description, appended claims, and accompanying drawings, where:

FIG. 3 is a perspective view showing a portion of a DMD-type spatial light modulator utilized by the printing system of FIG. 1 according to a specific embodiment of the present invention;

FIG. 4 is an exploded perspective view showing a light modulating element of the DMD-type spatial light modulator of FIG. 3 in additional detail;

FIGS. 5(A), 5(B) and 5(C) are perspective views showing the light modulating element of FIG. 3 during operation;

FIGS. 7(A), 7(B), 7(C) and 7(D) are simplified partial side views showing a printing operation performed by the single-color imaging system of FIG. 2;

DETAILED DESCRIPTION OF THE DRAWINGS

The present invention relates to improvements in imaging systems and related apparatus (e.g., scanners and printers). The following description is presented to enable one of ordinary skill in the art to make and use the invention as provided in the context of a particular application and its requirements. As used herein, directional terms such as "upper", "uppermost", "lower", "vertical" and "horizontal" are intended to provide relative positions for purposes of description, and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
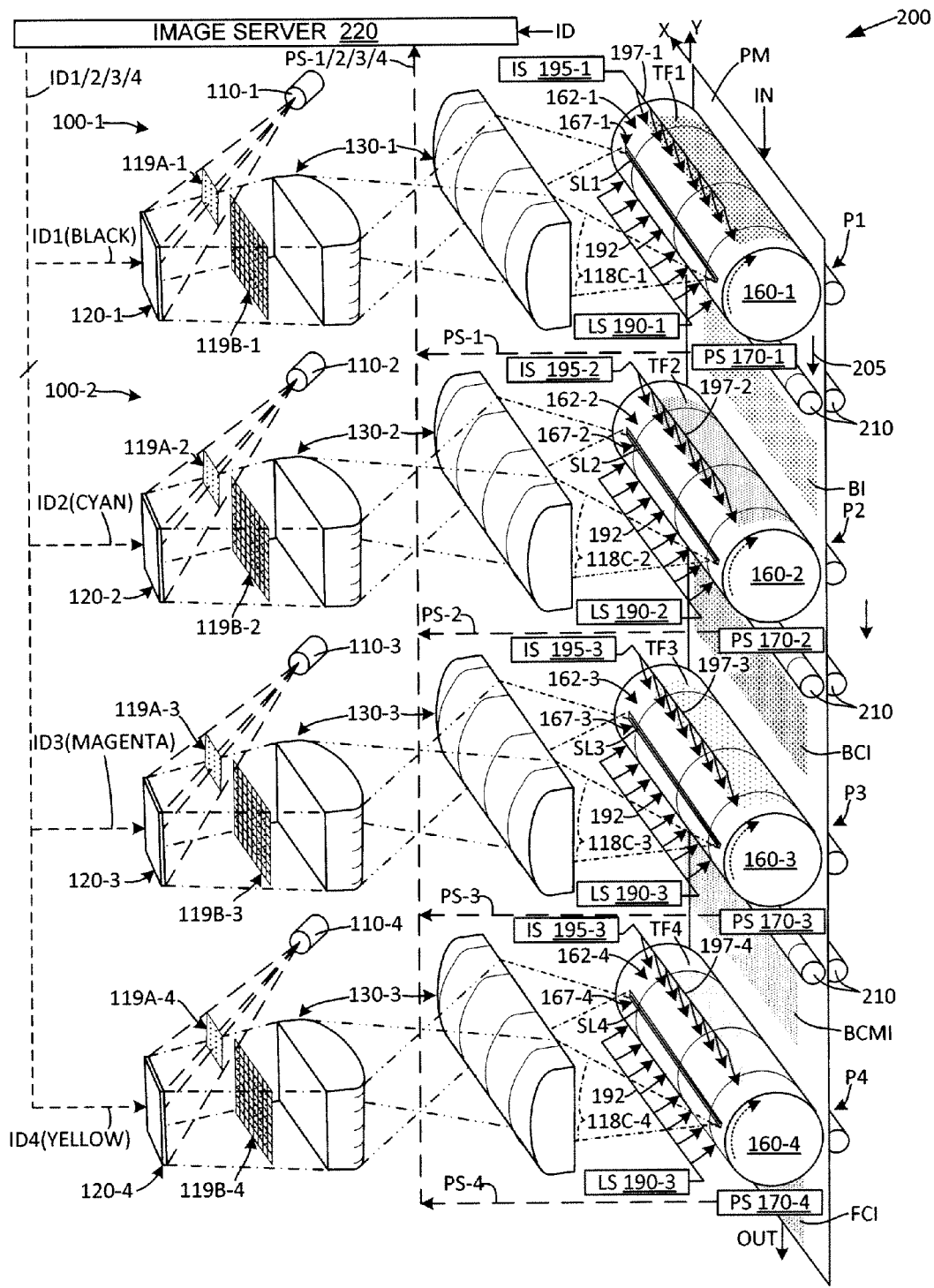
FIG. 1 is a partial top side perspective view showing a simplified reflex-type digital offset printing system according to an exemplary embodiment of the present invention.

FIG. 1 shows a reflex-type digital offset printing system 200 for generating a full color image FCI on a print medium PM (e.g., a paper sheet) in response to image data ID. Referring to the right side of FIG. 1, printing system 200 includes multiple feed rollers 210 that form a print medium feed path 205 for feeding print medium PM in a downward process direction (i.e., in a direction opposite to the indicated Y-axis). Printing system 200 also includes four single-color imaging systems 100-1, 100-2, 100-3 and 100-4 arranged in series along print medium feed path 205, where black imaging system 100-1 is configured to generate a black image component, cyan imaging system 100-2 is configured to generate a cyan image component, magenta imaging system 100-3 is configured to generate a magenta image component, and yellow single-color imaging system 100-4 is configured to generate a yellow image component. Finally, printing system 200 includes a system controller (image server) 220 that coordinates movement of print medium PM along the paper path 205 with the operation of single-color imaging systems 100-1 to 100-4 in order to generate full color image FCI on print medium PM in the manner detailed below.

Certain basic features of printing system 200 that are understood by those skilled in the art and subject to design choice are omitted from the description below to facilitate brevity in describing novel aspects of the present invention. First, paper path 205 is depicted in the figures in a greatly simplified form by feed rollers 210 in order to clearly indicate the novel relationship between single-color imaging systems 100-1 to 100-4 and print medium PM during the printing process. Those skilled in the art will recognize that additional structures (e.g., guide plates) and other necessary structures such as motors and mounting structures would be required to implement printing system 200 in a practical embodiment, and would also be able to design and implement a suitable feed path. In addition, given the functions of image server 220 that are described below, those skilled in the art would understand how to implement image server 220 in a practical setting using one or more of a microprocessor, programmable logic device or application specific integrated circuit. Other simplifications are also incorporated for brevity.

The imaging process described herein involves processing digital image data corresponding to an arbitrary two-dimensional image that is stored according to known techniques and referred to herein as image data ID. Consistent with most standardized image file formats, image data ID is separable into multiple single color data portions (e.g., black, cyan, magenta and yellow), where each single color data portion is made up of multiple scan line image data groups. Each scan line image data group includes multiple pixel image data portions, and each pixel image data portion includes one or more bits of image data corresponding to the color and grayscale properties of the corresponding pixel image associated with the corresponding portion of the two-dimensional image. In the exemplary embodiment shown in FIG. 1, image data ID is transmitted to image server 220, which processes image data ID in the manner described below, and transmits single color imaging data portions to single-color imaging systems 100-1 to 100-4 one scan line image data group at a time. Specifically, as indicated along the left edge of FIG. 1 by the dashed-line arrows, image server 220 transmits black imaging data portions ID1 to black imaging system 100-1, cyan imaging data portions ID2 to cyan imaging system 100-2, magenta imaging data portion ID3 to magenta imaging system 100-3, and yellow imaging portion ID4) to yellow imaging system 100-4. These image data transmissions are performed in a manner consistent with known techniques, and those skilled in the art will recognize that, in practical embodiments, a much larger number of pixel image data portions would be processed than the exemplary number described herein.

Referring to the left side of FIG. 1, each of single-color imaging systems 100-1 to 100-4 includes sub-system components that generate the single-color image portions in the manner described below that are successively transferred in a superimposed manner onto print medium PM to generate full color image FCI. Specifically, as indicated at the top of FIG. 1, black imaging system 100-1 includes a spatial light modulator 120-1 that is controlled by black image data ID1 to generate modulated light field 119B-1, which is then concentrated and focused by an anamorphic optical system 130-1 onto imaging cylinder 160-1. In addition, black imaging system 100-1 includes a light source 110-1, a liquid source 190-1 and a black ink source 195-1 that function as described below. Located below black imaging system 100-1 in FIG. 1 is cyan imaging system 100-2, which includes a light source 110-2, a spatial light modulator 120-2 that generates a modulated light field 119B-2 according to cyan image data ID2, an anamorphic optical system 130-2, an imaging cylinder 160-2, a liquid source 190-2 and a cyan ink source 195-2. Below cyan imaging system 100-2 is magenta imaging system 100-3, which includes a light source 110-3, a spatial light modulator 120-3 that generates a modulated light field 119B-3 according to magenta image data ID3, an anamorphic optical system 130-3, an imaging cylinder 160-3, a liquid source 190-3 and a magenta ink source 195-2. Finally, as indicated at the bottom of FIG. 1, a yellow imaging system 100-4 includes a light source 110-4, a spatial light modulator 120-4 that generates a modulated light field 119B-4 according to magenta image data ID4, an anamorphic optical system 130-4, an imaging cylinder 160-4, a liquid source 190-4 and a black ink source 195-4.

Figure 2:
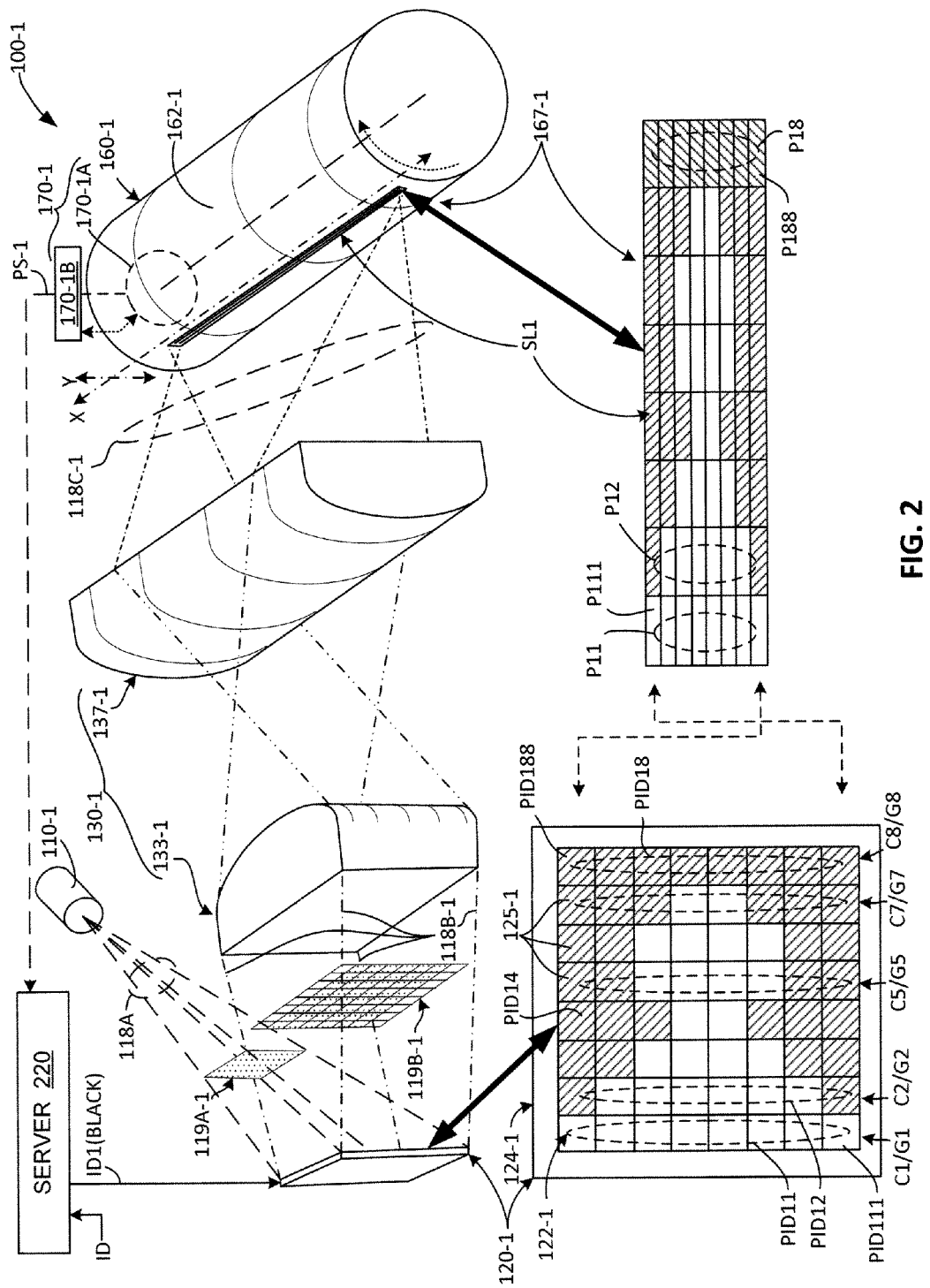
FIG. 2 is a perspective view showing one of four single-color imaging systems utilized by the printing system of FIG. 1 in additional detail.

FIG. 2 is a simplified perspective view showing black imaging system 100-1 in additional detail. The following description of black imaging system 100-1 is considered exemplary of each single-color imaging system 100-1 to 100-4 of reflex-type digital offset printing system 200, and therefore separate descriptions of these systems is omitted herein.

Referring to the upper left portion of FIG. 2, homogenous light generator 110-1 serves to generate continuous (i.e., constant/non-modulated) homogenous light 118A that forms a substantially uniform two-dimensional homogenous light field 119A-1, which is depicted by the projected dotted rectangular box and is made up of homogenous light 118A having substantially the same constant energy level (i.e., substantially the same flux density). In one embodiment homogenous light generator 110A-1 includes a light source and a light homogenizing optical system. In alternative embodiments, the light source includes an edge emitting laser diode bar or multiple diode bars stacked together, or multiple vertical cavity surface emitting lasers (VCSELs) arranged in a two-dimensional array (e.g., in a hexagonal closed packed configuration) on a carrier. The light homogenizer can be implemented using any of several different technologies and methods known in the art including but not limited to the use of a fast axis concentrator (FAC) lens together with microlens arrays for beam reshaping, or additionally a light pipe approach which causes light mixing within a waveguide.

Referring to the left edge of FIG. 2, spatial light modulator 120-1 is operably disposed in two-dimensional light field 119A-1, and includes individually adjustable light modulating elements that are arranged in a two-dimensional array. According to the disclosed embodiment of the present invention, spatial light modulator 120-1 is implemented using one or more digital micromirror devices (DMDs), such as a digital light processing (DLP®) chip available from Texas Instruments of Dallas Tex., USA. As described in additional detail below, DMD-type spatial light modulator (hereafter "DMD") 120-1 includes an array of microelectromechanical (MEMs) mirror mechanisms (light modulating elements), each MEMs mirror mechanism including a mirror that is individually adjustable between a first tilted position ("on" modulated state) in which incident light is reflected toward associated anamorphic optical system 130-1, and a second tilted position ("off" modulated state) in which an incident light portion is reflected away from anamorphic optical system 130-1, whereby a two-dimensional modulated light field is formed only by associated portions of the homogenous light field directed onto the MEMs mirror mechanisms that are disposed in the "on" modulated state. In alternative embodiments (not shown) the spatial light modulator of each single-color imaging system 100-1 to 100-4 is implemented using an electro-optic diffractive modulator array such as the Linear Array Liquid Crystal Modulator available from Boulder Nonlinear Systems of Lafayette, Colo., USA, or an array of thermo-optic absorber elements such as Vanadium dioxide reflective or absorbing mirror elements. In each of these alternative spatial light modulator embodiments, multiple light modulating elements are arranged in a two-dimensional array and are individually adjustable between a first "on" modulated state is which light is passed to an associated anamorphic optical system, and a second "off" modulated state in which an incident light portion is blocked or otherwise prevented from entering the associated anamorphic optical system, thereby producing the two-dimensional modulated light field described below. While any of a variety of spatial light modulators may be suitable for a particular application, many print/scanning applications today require a resolution 1200 dpi and above, with high image contrast ratios over 10:1, small pixel size, and high speed line addressing over 30 kHz. Based on these specifications, the currently preferred spatial light modulator is the DLP™ chip due to its best overall performance. However, the appended claims are intended to cover any of the spatial light modulators mentioned above, or their functional equivalents, unless otherwise specifically limited to DMDs or any other particular spatial light modulator.

FIG. 3 is a perspective view showing a portion of a simplified DMD-type spatial light modulator (DMD) 120-1 according to a specific embodiment of the present invention. DMD 120-1 generally includes a modulating element array 122-1 made up of multiple microelectromechanical (MEMs) mirror mechanisms 125-1 that are arranged in a rectangular array on a semiconductor substrate (i.e., "chip" or support structure) 124-1. Each mirror mechanism 125-1 is controlled as described below by a control circuit 126-1 that also is fabricated on substrate 124-1 according to known semiconductor processing techniques, and is disposed below mirrors 125-1. Although only sixty-four mirror mechanisms 125-1 are shown in FIG. 3 for illustrative purposes, those skilled in the art will understand that any number of mirror mechanisms are disposed on DMD-type modulating element array 122-1, and that DMDs sold by Texas Instruments typically include several hundred thousand mirrors per device.

FIG. 4 is a combination exploded perspective view and simplified block diagram showing exemplary mirror mechanism 125-11 of DMD-type modulating element array 122-1 (see FIG. 2) in additional detail. For descriptive purposes, mirror mechanism 125-11 is segmented into an uppermost layer 210, a central region 220, and a lower region 230, all of which being disposed on a passivation layer (not shown) formed on an upper surface of substrate 124-1. Uppermost layer 210 of mirror mechanism 125-11 includes a square or rectangular mirror (light modulating structure) 212 that is made out of aluminum and is typically approximately 16 micrometers across. Central region 220 includes a yoke 222 that connected by two compliant torsion hinges 224 to support plates 225, and a pair of raised electrodes 227 and 228. Lower region 230 includes first and second electrode plates 231 and 232, and a bias plate 235. In addition, mirror mechanism 125-11 is controlled by an associated SRAM memory cell 240 (i.e., a bi-stable flip-flop) that is disposed on substrate 124-1 and controlled to store either of two data states by way of control signal 127-1, which is generated by control circuit 126-1 in accordance with image data as described in additional detail below. Memory cell 240 generates complementary output signals D and D-bar that are generated from the current stored state according to known techniques.

Lower region 230 is formed by etching a plating layer or otherwise forming metal pads on a passivation layer (not shown) formed on an upper surface of substrate 124-1 over memory cell 240. Note that electrode plates 231 and 232 are respectively connected to receive either a bias control signal 127-2 (which is selectively transmitted from control circuit 126-1 in accordance with the operating scheme set forth below) or complementary data signals D and D-bar stored by memory cell 240 by way of metal vias or other conductive structures that extend through the passivation layer.

Central region 220 is disposed over lower region 230 using MEMS technology, where yoke 222 is movably (pivotably) connected and supported by support plates 225 by way of compliant torsion hinges 224, which twist as described below to facilitate tilting of yoke 222 relative to substrate 124-1. Support plates 225 are disposed above and electrically connected to bias plate 235 by way of support posts 226 (one shown) that are fixedly connected onto regions 236 of bias plate 235. Electrode plates 227 and 228 are similarly disposed above and electrically connected to electrode plates 231 and 232, respectively, by way of support posts 229 (one shown) that are fixedly connected onto regions 233 of electrode plates 231 and 232. Finally, mirror 212 is fixedly connected to yoke 222 by a mirror post 214 that is attached onto a central region 223 of yoke 222.

FIGS. 5(A) to 5(C) are perspective/block views showing mirror mechanism 125-11 of FIG. 3 during operation. FIG. 5(A) shows mirror mechanism 125-11 in a first (e.g., "on") modulating state in which received light portion 118A-11 is reflected to form modulated light portion 118B-11 that leaves mirror 212 at a first angle θ1. To set this "on" modulating state, SRAM memory cell 240 stores a previously written data value such that output signal D includes a high voltage (VDD) that is transmitted to electrode plate 231 and raised electrode 227, and output signal D-bar includes a low voltage (ground) that is transmitted to electrode plate 232 and raised electrode 228. These electrodes control the position of the mirror by electrostatic attraction. The electrode pair formed by electrode plates 231 and 232 is positioned to act on yoke 222, and the electrode pair formed by raised electrodes 227 and 228 is positioned to act on mirror 212. The majority of the time, equal bias charges are applied to both sides of yoke 222 simultaneously (e.g., as indicated in FIG. 5(A), bias control signal 127-2 is applied to both electrode plates 227 and 228 and raised electrodes 231 and 232). Instead of flipping to a central position, as one might expect, this equal bias actually holds mirror 122 in its current "on" position because the attraction force between mirror 122 and raised electrode 231/ electrode plate 227 is greater (i.e., because that side is closer to the electrodes) than the attraction force between mirror 122 and raised electrode 232/electrode plate 228.

To move mirror 212 from the "on" position to the "off" position, an associated image data bit IBD written into SRAM memory cell 240 from image server 220 (see FIG. 1) is loaded into SRAM memory cell 240 by way of control signal 127-1 (see the lower portion of FIG. 5(A). As indicated in FIG. 5(B), once all the SRAM cells of array 122-1 have been loaded with image data, the bias control signal is de-asserted, thereby transmitting the D signal from SRAM cell 240 to electrode plate 231 and raised electrode 227, and the D-bar from SRAM cell 240 to electrode plate 232 and raised electrode 228, thereby causing mirror 212 to move into the "off" position shown in FIG. 5(B), whereby received light portion 118A-11 is reflected at a second angle 82 to form light portion 118B-12. In one embodiment, the flat upper surface of mirror 212 tilts (angularly moves) in the range of approximately 10 to 12° between the "on" state illustrated in FIG. 5(A) and the "off" state illustrated in FIG. 5(B). When bias control signal 127-2 is subsequently restored, as indicated in FIG. 5(C), mirror 212 is maintained in the "off" position, and the next required movement can be loaded into memory cell 240. This bias system is used because it reduces the voltage levels required to address the mirrors such that they can be driven directly from the SRAM cells, and also because the bias voltage can be removed at the same time for the whole chip, so every mirror moves at the same instant.

As indicated in FIGS. 5(A) to 5(C), the rotation torsional axis of mirror mechanism 125-11 causes mirrors 212 to rotate about a diagonal axis relative to the x-y coordinates of the DLP chip housing. This diagonal tilting requires that the incident light portions received from the spatial light modulator in an imaging system be projected onto each mirror mechanism 125-1 at a compound incident angle so that the exit angle of the light is perpendicular to the surface of the DLP chip. This requirement complicates the side by side placement of imaging systems.

Referring again to FIG. 2, as mentioned above, anamorphic optical system 130-1 is positioned to receive two-dimensional modulated light field 119B-1 from DMD 120-1, and arranged to concentrate modulated light field 119B-1 in an elongated scanning region 167-1 of imaging surface 162-1 such that concentrated modulated light portions 118C remove fountain solution 192 from elongated scanning region 167-1/ 2/3/4 in the manner described below to produce elongated scan line image SL1 that is aligned in the cross-process (X-axis) direction.

Figure 6A:
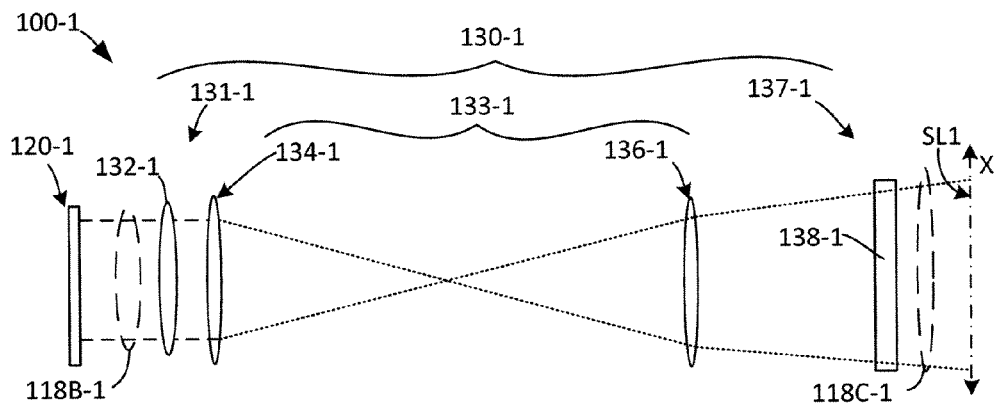
FIGS. 6(A) and 6(B) are simplified ray diagrams showing a multi-lens anamorphic optical system utilized by the imaging system of FIG. 2 according to an alternative embodiment of the present invention.
Figure 6B:
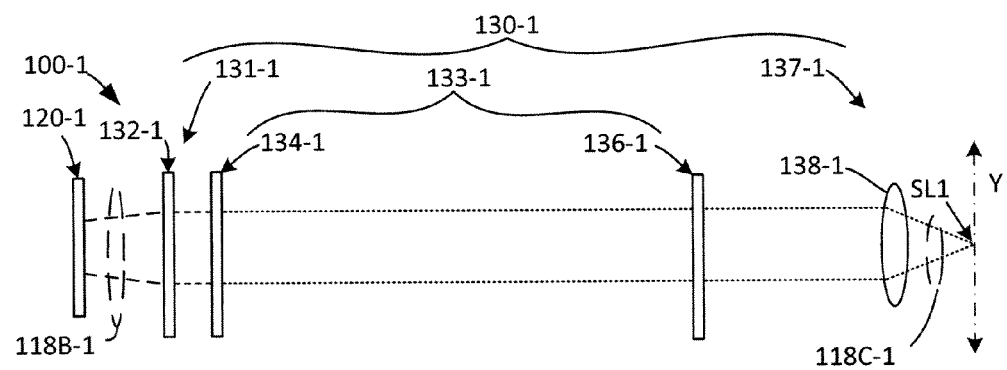

FIGS. 6(A) and 6(B) are simplified ray trace diagrams showing an exemplary practical anamorphic system 130-1 in a linear "unfolded" arrangement. In practice, each anamorphic system 130-1 to 130-4 is typically composed of multiple separate cylindrical or acylindrical lenses, such as those shown in FIGS. 6(A) and 6(B), but is not limited to the disclosed generalized lens or specific lens systems. Referring to FIG. 6(A), anamorphic optical system 130-1 includes an optional collimating optical subsystem 131-1, a cross-process optical subsystem 133-1, and process-direction optical subsystem 137-1 according to an exemplary specific embodiment of the present invention. As indicated by the ray traces in FIGS. 6(A) and 6(B), optical subsystems 131-1, 133-1 and 137-1 are disposed in the optical path between DMD 120-1 and scan line SL1, which is generated as described above. FIG. 6(A) is a top view indicating that collimating optical subsystem 131-1 and cross-process optical subsystem 133-1 act on the modulated light portions 118B-1 passed by DMD 120-1 to form concentrated light portions 118C at scan line SL1 that are parallel to the X-axis (i.e., in the cross-process direction), and FIG. 6(B) is a side view that indicates how collimating optical subsystem 131-1 and process-direction optical subsystem 137-1 act on modulated light portions 118B-1 passed by DMD 120-1 and generate concentrated light portions 118C at scan line SL in a direction perpendicular to the Y-axis (i.e., in the process direction). Optional collimating optical subsystem 131-1 includes a collimating field lens 132-1 formed in accordance with known techniques that is located immediately after DMD 120-1, and arranged to collimate the light portions that are slightly diverging off of the surface of the DMD 120-1. Cross-process optical subsystem 133-1 is a two-lens cylindrical or acylindrical projection system that magnifies light in the cross-process (scan) direction (i.e., along the X-axis), and process-direction optical subsystem 137-1 is a cylindrical or acylindrical single focusing lens subsystem that focuses light in the process (cross-scan) direction (i.e., along the Y-axis). The advantage of this arrangement is that it allows the intensity of the light (e.g., laser) power to be concentrated on scan line SL located at the output of single-pass imaging system 100-1. Two-lens cylindrical or acylindrical projection system 133-1 includes a first cylindrical or acylindrical lens 134-1 and a second cylindrical or acylindrical lens 136-1 that are arranged to project and magnify modulated light portions (imaging data) 118B-1 passed by DMD 120-1 (and optional collimating optical subsystem 131-1) onto an imaging surface (e.g., a cylinder) in the cross process direction. Lens subsystem 137-1 includes a third cylindrical or acylindrical lens 138-1 that concentrates the projected imaging data down to a narrow high resolution line image on scan line SL. As the focusing power of lens 138-1 is increased, the intensity of the light on DMD 120-1 is reduced relative to the intensity of the line image generated at scan line SL. However, this means that cylindrical or acylindrical lens 138-1 must be placed closer to the process surface (e.g., an imaging drum) with a clear aperture extending to the very edges of lens 138-1. Additional details regarding anamorphic optical system 130-1 are described in co-pending application Ser. No. 13/216,976, entitled ANAMORPHIC PROJECTION OPTICAL SYSTEM, which is incorporated herein by reference in its entirety.

Referring again to FIG. 2, DMD 120-1 is positioned relative to light source 110-1 and anamorphic optical system 130-1 in a folded arrangement (i.e., at a compound angle) such that the incident homogenous light forming homogenous light field 119A is neither parallel nor perpendicular to any of the orthogonal axes defined by the reflecting surfaces of DMD 120-1. With the components of imaging system 100-1 positioned in this "folded" arrangement, homogenous light portions that are directed onto DMD 120-1 are reflected from MEMs mirror mechanism 125-1 to anamorphic optical system 130-1 only when the mirrors of each MEMs mirror mechanism 125-1 are in the "on" position (e.g., as described above with reference to FIG. 5(A)). The compound angle between the input rays 118A to the output modulated rays 118B-1 directed towards anamorphic system 130-1 is typically 22-24 degrees, or twice the mirror rotation angle of the DMD chip. Conversely, each MEMs mirror mechanism 125-1 that is in the "off" position (described above with reference to FIG. 5(B)) reflects an associated one of light portions 118B-1 at a second angle such that the reflected light portion is directed away from anamorphic optical system 130-1. The compound angle between the entrance and "off" rays is usually approximately 48 degrees. According to an aspect of the preferred folded arrangement, imaging system 100-1 includes a heat sink structure (not shown) that is positioned to receive light portions that are reflected by MEMs mirror mechanisms 125-1 in the "off" position. According to another aspect of the preferred folded arrangement using the compound incident angle design set forth above, the components of imaging system 100-1 are arranged in a manner that facilitates the construction of a seamless "stitched" assembly including any number of identical imaging systems 100-1, as set forth below. In one embodiment, the components of the system shown in FIG. 2 are maintained in the "folded" arrangement by way of a rigid frame that is described in detail in co-pending application Ser. No. 13/216,817, entitled SINGLE-PASS IMAGING SYSTEM USING SPATIAL LIGHT MODULATOR AND ANAMORPHIC PROJECTION OPTICS, which is incorporated herein by reference in its entirety.

Referring again to FIGS. 2 and 3, MEMS mirror elements 125-1 are arranged in rows and columns, and anamorphic optical system 130-1 is arranged to concentrate light portions received from each column of MEMS mirror elements 125-1 onto an associated imaging "pixel" region of elongated line image SL1 (i.e., such that the numerous image pixel "dots" are arranged in the cross-process direction). That is, the concentrated modulated light portions 118C received from all of the MEMS mirror elements in a given column (and in the "on" modulated state) are directed by anamorphic optical system 130-1 onto the same corresponding image pixel region of line image SL1 so that the resulting image "pixel" (dot) is the composite light from all MEMS mirror elements in the given column that are in the "on" state. A key aspect of the present invention lies in understanding that the light portions passed by each "on" MEMS mirror element represents one pixel of binary data that is delivered to the line image by the anamorphic optical system, so that the brightness of each image "pixel" making up the line image is controlled by the number of elements in the associated column that are in the "on" state. Accordingly, by individually controlling the multiple mirror elements disposed in each column, and by concentrating the light passed by each column onto a corresponding imaging region, each single-color imaging system has gray-scale capabilities using constant (non-modulated) homogenous light. In addition, if the position of a group of "on" pixels in each column is adjusted up or down the column, this arrangement facilitates software electronic compensation of bow (i.e. "smile" of a straight line) and skew.

Imaging system 100-1 is controlled by system server (controller) 220, which transmits "black" image data portions ID1 to DMD 120-1 in accordance with timing determined by the rotational position of imaging cylinder 160-1, whereby DMD 120-1 transmits the image data through anamorphic optical system 130-1 and onto imaging cylinder 160-1. According to an embodiment of the invention, as indicated by the dashed lines representing rays 118B-1 and 118C-1 in FIG. 2, anamorphic optical system 130-1 inverts modulated light field 119B in both the process and cross-process directions such that the position and left-to-right order of line image SL1 generated on imaging drum cylinder 160-1 is effectively "flipped" in both the process and cross-process directions. The diagram at the lower left portion of FIG. 2 shows a front view of DMD 120-1, and the diagram at the lower right portion of FIG. 2 shows a front view of elongated imaging region 167-1 of imaging surface 162-1. The lower left diagram shows that modulating element column Cl forms a first modulating element group G1 that is controlled by a corresponding pixel image data portion PID11 (i.e., image data corresponding to a single image pixel or "dot"). Similarly, the remaining light modulating element columns form corresponding modulating element groups that implement the remaining pixel image data portions of scan line image data portions (e.g., column C4 forms group G4 that implements pixel image data portion PID14, and column C8 forms group G8 that implements pixel image data portion PID18. Note that modulating element groups G1-G8 are written into spatial light modulator 120H in an "upside-down and backward" manner such that pixel image data bit PID111 of pixel image data portion PID11 is written an inverted (upside-down) manner into a lowermost modulating element of modulating element group G1 (i.e., the lower left portion of array 122-1 when viewed from the front), and pixel image data bit PID188 of pixel image data portion PID18 is written in an inverted (upside-down) manner in the upper portion of modulating element group G8 (i.e., the upper right portion of array 122-1 when viewed from the front). As indicated by the double-dot-dash lines in FIG. 2, cross-process optical subsystem 133-1 inverts modulated light field 119A such that the light modulating elements configured by pixel image data PID11 generate pixel image P11 on the right side of elongated imaging region 167-1, and the light modulating elements configured by pixel image data PID18 generate pixel image P18 on the upper left side of elongated imaging region 167-1. In addition, process optical subsystem 137-1 inverts modulated light field 119A such that (non-inverted) pixel image portion (which is generated by the modulating element implementing pixel image data bit PID111) appears in the upper-left portion of elongated imaging region 167-1, and such that (non-inverted) pixel image P188 (which is generated by the modulating element implementing pixel image data bit PID188) appears in the lower-right portion of elongated imaging region 167-1.

According to an embodiment of the present invention, multi-level image exposure is achieved using imaging system 100-1 by configuring groups of MEMS mirror mechanisms of DMD-type spatial light modulator 120-1 that are substantially aligned in the process (Y-axis) direction such that "partially on" pixel images are implemented by activating contiguous MEMS mirror mechanisms that are disposed in the central region of the associated MEMS mirror mechanism group. For example, in the exemplary embodiment shown in FIG. 2, modulating element group G1 consists of the modulating elements 125-1 disposed in column C1, where group G1 is configured in accordance with a first image pixel data portion PID11 such that all of the modulating elements are disposed an "on" modulated state (indicated by the white filling each element), whereby a pixel image P11 is generated on imaging surface 162-1 having a maximum brightness. Similarly, modulating element group G8 consists of the modulating elements 125-1 disposed in column C8, where group G8 is configured in accordance with an image pixel data portion PID18 such that all of the modulating elements are disposed an "off" modulated state (indicated by the slanted-line shading that fills each element), whereby a dark pixel image P18 is generated on imaging surface 162H. Additional information regarding multi-level imaging using the arrangement shown in FIG. 2 is described co-owned and co-pending U.S. patent application Ser. No. 13/252,943, Filed Oct. 4, 2011, entitled "MULTI-LEVEL IMAGING USING SINGLE-PASS IMAGING SYSTEM HAVING SPATIAL LIGHT MODULATOR AND ANAMORPHIC PROJECTION OPTICS", which is incorporated herein by reference in its entirety.

FIGS. 7(A), 7(B), 7(C) and 7(D) are simplified side views depicting an exemplary single-color imaging operation performed by imaging system 100-1. Note that the simplified side views ignore inversion in the process-direction, and as such anamorphic optical system 130-1 is depicted by a single cross-process lens. Note also that the exemplary black-ink imaging operation shown in FIGS. 7(A)-7(D) are essentially identical to cyan-ink, magenta-ink and yellow-ink imaging operations performed by imaging systems 100-2, 100-3 and 100-4 of printing system 200 (see FIG. 1).

FIG. 7(A) illustrates imaging system 100-1(T1) (i.e., imaging system 100-1 during a first time period T1 of the imaging operation) when an exemplary group of MEMs mirror mechanisms (i.e., the column including MEMs mirror mechanisms 125-21 to 125-28, see FIG. 2) of spatial light modulator 120-1 is respectively configured in accordance with scan line image data group PID12. In particular, FIG. 7(A) depicts the configuration of modulating elements 125-21 to 125-28 using pixel image data portion PID12 such that MEMs mirror mechanisms 125-22 to 125-27 are activated ("on") and MEMS mirror mechanisms 125-21 and 125-28 are deactivated ("off").

Referring to the right side of FIG. 7(A), the various components of imaging system 100-1 are arranged in fixed radial positions around imaging cylinder 160-1 such that imaging surface 162-1 continuously rotates in a clockwise "downstream" direction relative to the radial positions. For example, liquid source e.g., 190-1 is operably positioned at a lower (first) radial position R1 to apply fountain solution 192 onto imaging surface 162-1 such that fountain solution 192 is transferred in the clockwise "downstream" direction as imaging surface 162-1 rotates. Spatial light modulator 120-1 and anamorphic optical system 130-1 are positioned at a front middle (second) radial position R2 and arranged to generate concentrated modulated light portions 118C-1 that selectively remove fountain solution 192 from elongated scanning region 167-1. Imaging system 100-1 further includes a black ink source 195-1 that applies a black ink material 197-1 at third radial position R3 downstream from imaging region 167-1. The subsequent transfer of any ink material 197-1 adhered to imaging surface 162-1 onto a print medium (not shown in FIG. 7(A)) occurs at a back middle (fourth) radial position R4, and a cleaning mechanism 198-1 is provided downstream from the transfer point for preparing imaging surface 162-1 for the next exposure cycle. The image transfer operation is further described below with reference to FIGS. 7(A) to 7(D).

Referring again to FIG. 7(A), because of their activated configuration state, MEMs mirror mechanisms (light modulating elements) 125-22 to 125-27 reflect portions of homogenous light field 119A-1 such that modulated light portions 118B-21 to 118B-27 are directed through anamorphic optical system 130-1 (note that homogeneous light portions are redirected away from anamorphic optical system 130-1 by deactivated MEMs mirror mechanisms 125-21 and 125-28). Modulated light portions 118B-21 to 118B-27 form modulated light field 119B-1 that is imaged and concentrated by anamorphic optical system 130-1, thereby generating concentrated modulated light 118C-1 that produces pixel image P12, which forms part of a scan line image SL1 in elongated surface region 162-11 of imaging surface 162-1. In particular, concentrated modulated light 118C-1 removes (evaporates) fountain solution 192 from the elongated imaging region 162-11 (i.e., such that a portion of imaging surface 162-1 at pixel image P21 is exposed). Note that the size of pixel image P21 (i.e., the amount of fountain solution that is removed from imaging surface 162-1) is determined by number of activated MEMs mirror mechanisms.

FIGS. 7(B), 7(C) and 7(D) show imaging system 100-1 at times subsequent to time T1, where spatial light modulator 120-1 is deactivated in order to illustrate how surface feature P12 (see FIG. 7(A)) is subsequently utilized in accordance with the image transfer operation of imaging system 100-1. Referring to FIG. 7(B), at a time T2 drum cylinder 160-1 has rotated such that surface region 162-11 has passed under black ink source 195-1. Due to the removal of fountain solution depicted in FIG. 7(A), black ink material 197-1 adheres to exposed surface region 162-11 to form an ink feature TF. That is, in accordance with the present embodiment, black ink material 197-1 is formulated such that it adheres only to exposed portion 162-11 of imaging surface 162-1 (i.e., from which fountain solution 192 has been removed by concentrated modulated light 118C-1), whereby a portion of black ink material 197-1 forms a single-color in feature TF1 on exposed portion 162-11. Referring to FIG. 7(C), at a time T3 while ink feature TF is passing the transfer point, the weak adhesion between the ink material and surface region 161-11 and the strong attraction of the ink material to the print medium (not shown) causes ink feature TF1 to transfer to the print medium, resulting in a printed black ink "dot" on the print medium. At a subsequent T4, as indicated in FIG. 7(D), surface region 162-11 is rotated under cleaning mechanism 198-1, which removes any residual ink and fountain solution material to prepare surface region 162-11 for a subsequent exposure/print cycle. According to the above-described image transfer operation, black ink material only transfers onto portions of imaging surface 162-1 that are exposed by the imaging process described above (i.e., ink material does not adhere to fountain solution 192), whereby ink material is only transferred to the print medium from portions of drum cylinder 160-1 that are subjected to concentrated light as described herein. Thus, variable data from fountain solution removal is transferred, instead of constant data from a plate as in conventional systems. For this process to work using a rastered light source (i.e., a light source that is rastered back and forth across the scan line), a single very high power light (e.g., laser) source would be required to sufficiently remove the fountain solution in real time. A benefit of the imaging operation of the present invention is that, because liquid is removed from the entire scan line simultaneously, an offset press configuration is provided at high speed using multiple relatively low power light sources.

Referring back to FIG. 1, image server 220 coordinates the movement of print medium PM along paper path 205 with the operation of imaging systems 100-1 to 100-4 such that single-color image portions TF1, TF2, TF3 and TF4, which are generated as described above with reference to FIGS. 7(A) to 7(D), are transferred in a precise registration onto print medium PM in order to form full color image FCI. That is, single-color imaging systems 100-1 to 100-4 are arranged in series such that the outer imaging surfaces of imaging cylinders 160-1 to 160-4 intersect the print medium feed path 205 at respective positions along feed path 205. In the exemplary embodiment, black imaging system 100-1 is disposed at an uppermost (first) position P1 of the print medium feed path 205 (i.e., immediately below paper feed path inlet IN) such that black image portions TF1 are transferred onto print medium PM to form a black image BI. Cyan imaging system 100-2 is disposed at an upper middle (second) position P2 that is immediately downstream from black imaging system 100-1 such that cyan image portions TF2 are superimposed over the black image to form a black/cyan image BCI on print medium PM. Magenta imaging system 100-3 is disposed at a subsequent (third) serial position P3 that is immediately downstream from cyan imaging system 100-2 such that magenta image portions TF3 are transferred onto print medium PM to form a black/cyan/magenta image BCMI. Finally, yellow imaging system 100-4 is disposed at a lowermost (fourth) position P4 such that yellow image portions TF4 are superimposed over the black/cyan/magenta image to form full color image FCI on print medium PM just before it passes through the feed path outlet OUT.

In accordance with an embodiment of the present invention, each single-color digital imaging system 100-1 to 100-4 utilizes a position (or motion) sensor 170-1 to 170-4 that sends a respective drum position signal PS-1 to PS-4 to the image server 220, and image server 220 utilizes drum position signals PS-1 to PS-4 to synchronize the single-color printing operations with the position of imaging drum cylinder 160-1, and thus implicitly, with the position of printing medium PM in print medium feed path 205 in the manner described below with reference to FIGS. 8(A) to 8(F). As indicated in FIG. 2, according to alternative embodiments, each position sensor (e.g., position sensor 170-1) is implemented by a rotary shaft encoder 170-1A or surface motion encoder 170-1B that serve to accurately measure the displacement of the imaging cylinder (drum) surface as it moves under the focal region of anamorphic optical system 130-1. In this way, registration of the single-color images across print medium PM is made possible by providing consistent pixel placement of each color separation onto the respective color imaging cylinder 160-1 to 160-4, which further enables digital offset printing with acceptable color image registration. In one embodiment an index is read from each imaging cylinder that provides a once per revolution reference point such that reflex correction profiles can be implemented to correct for runout or eccentricity errors and to provide repeatable location of each color image on the respective imaging cylinders.

8(A)-8(F) are simplified partial side views showing printing system 200 during an exemplary full color printing operation in which four contiguous single-color image portions ("dots") are printed onto a print medium.

Figure 8A:
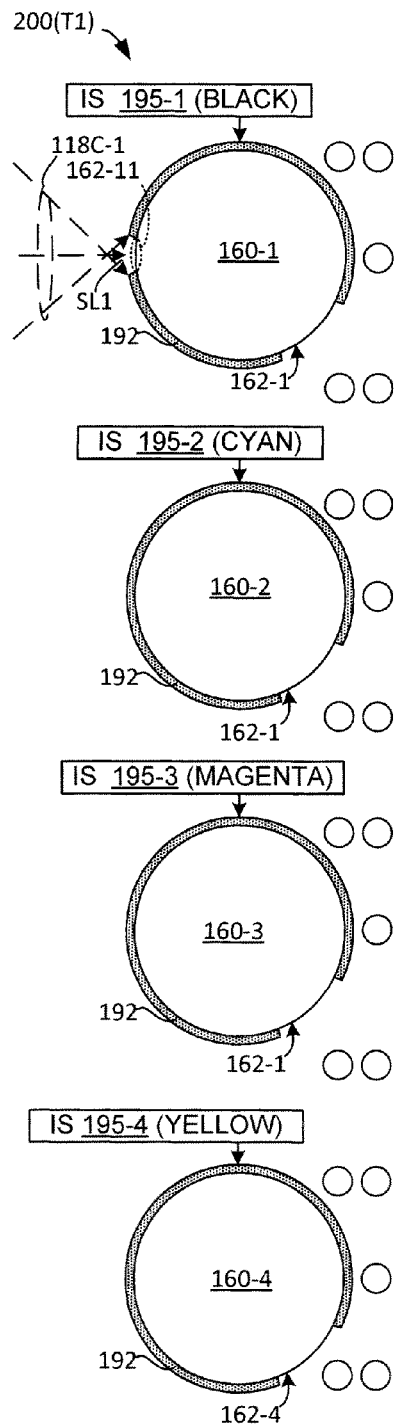
FIGS. 8(A), 8(B), 8(C), 8(D), 8(E) and 8(F) are simplified partial side views showing the printing system of FIG. 1 during an exemplary printing operation.

FIG. 8(A) illustrates reflex-type digital offset printing system 200(T1) (i.e., printing system 200 during a first time period T1 of the printing operation) during which imaging system 100-1 generates modulated light 118C-1 to form part of scan line image SL1 in elongated surface region 162-11 of imaging surface 162-1 in the manner described above with FIG. 7(A). At this point imaging systems 100-2, 100-3 and 100-4 are essentially deactivated.

Figure 8B:
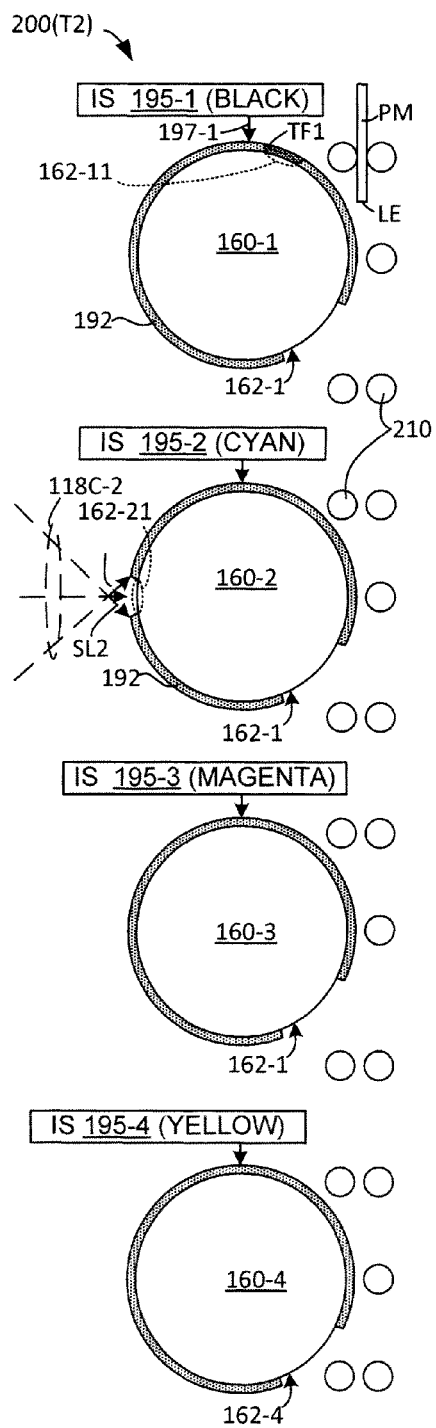

FIG. 8(B) illustrates reflex-type digital offset printing system 200(T2) (i.e., printing system 200 during a second time period T2 subsequent to time T1) when drum cylinder 160-1 has rotated such that surface region 162-11 has passed under black ink source 195-1 to generate black ink feature TF1 in the manner described above with reference to FIG. 7(B). At the same time, print medium PM is moved along feed path 205 by way of feed rollers 210 such that a leading edge LE of print medium PM is positioned near imaging cylinder 150-1. In addition, cyan imaging system 100-2 generates modulated light 118C-2 at time T2 to form part of scan line image SL2 in elongated surface region 162-21 of imaging surface 162-2. Imaging systems 100-3 and 100-4 remain essentially deactivated at time T2.

Figures 8C, 8D:
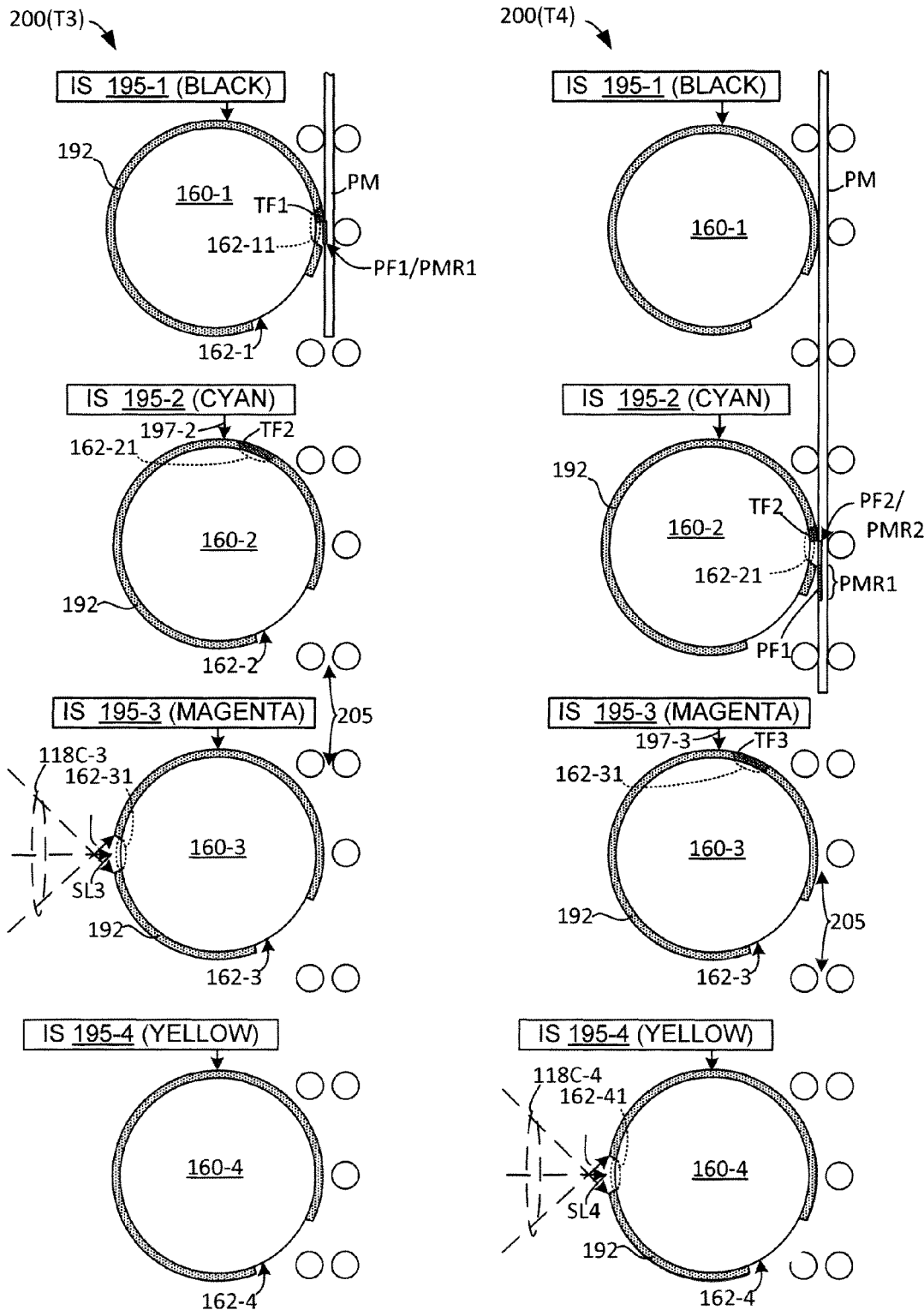

FIG. 8(C) illustrates printing system 200 at a subsequent time T3 when drum cylinder 160-1 has reached the transfer point located in feed path 205, causing ink feature TF1 to transfer onto a first print medium region PMR1, resulting in a printed black ink "dot" PF1 on print medium PM, which is now operably positioned in feed path 205 such that targeted region PMR1 is properly positioned for the transfer. At the same time, drum cylinder 160-2 rotates such that surface region 162-21 has passed under cyan ink source 195-2 to generate cyan ink feature TF2 in surface region 162-21 of imaging surface 162-2 on imaging cylinder 160-2, and magenta imaging system 100-3 generates modulated light 118C-3 to form part of scan line image SL3 in elongated surface region 162-31 of imaging surface 162-3 on imaging cylinder 160-3. Imaging system 100-4 remains essentially deactivated at time T3.

FIG. 8(D) illustrates printing system 200 at a subsequent time T4 when black imaging system 100-1 is now essentially deactivated and print medium PM has moved further down feed path 205 such that a second targeted print medium region PMR2 is precisely aligned with the transfer point associated with drum cylinder 160-2, causing ink feature TF2 to transfer onto region PMR2, resulting in a printed cyan ink "dot" PF2 on print medium PM. At the same time, drum cylinder 160-3 rotates such that surface region 162-31 has passed under magenta ink source 195-3 to generate magenta ink feature TF3 in surface region 162-31 of imaging surface 162-3 on imaging cylinder 160-3, and yellow imaging system 100-4 generates modulated light 118C-4 to form part of scan line image SL4 in elongated surface region 162-41 of imaging surface 162-4 on imaging cylinder 160-4.

Figure 8E:
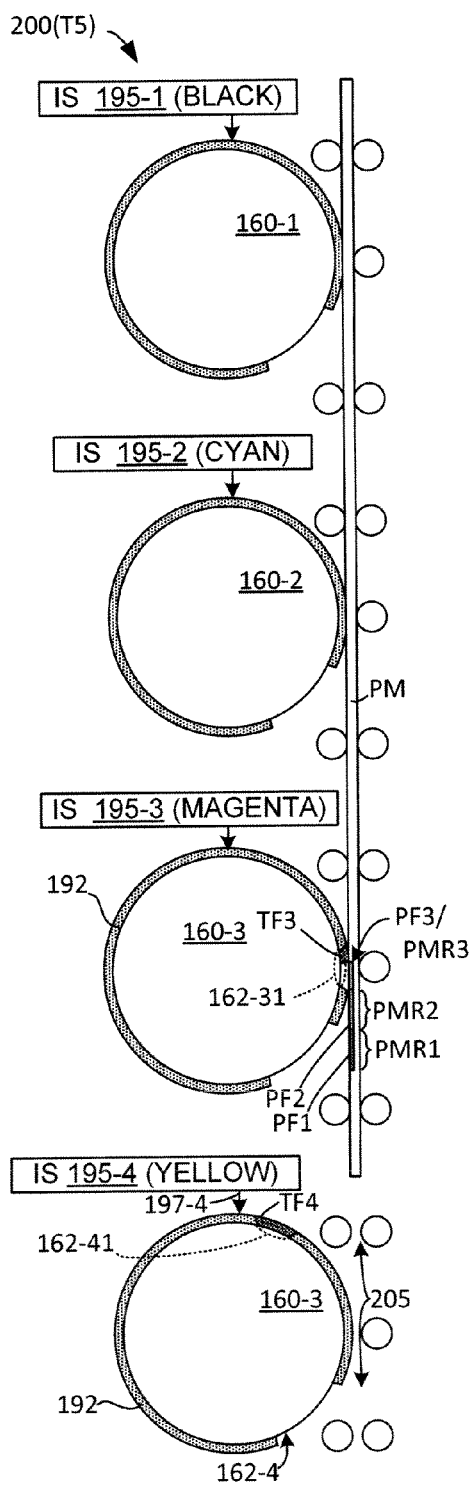

FIG. 8(E) illustrates printing system 200 at a subsequent time T5 when imaging systems 100-1 and 100-2 are now essentially deactivated, and print medium PM has moved further down feed path 205 such that a third targeted print medium region PMR3 is precisely aligned with the transfer point associated with drum cylinder 160-3, causing magenta ink feature TF3 to transfer onto region PMR3 to produce ink "dot" PF3. At the same time, drum cylinder 160-4 rotates such that surface region 162-41 has passed under yellow ink source 195-4 to generate ink feature TF4 on imaging cylinder 160-4.

Figure 8F:
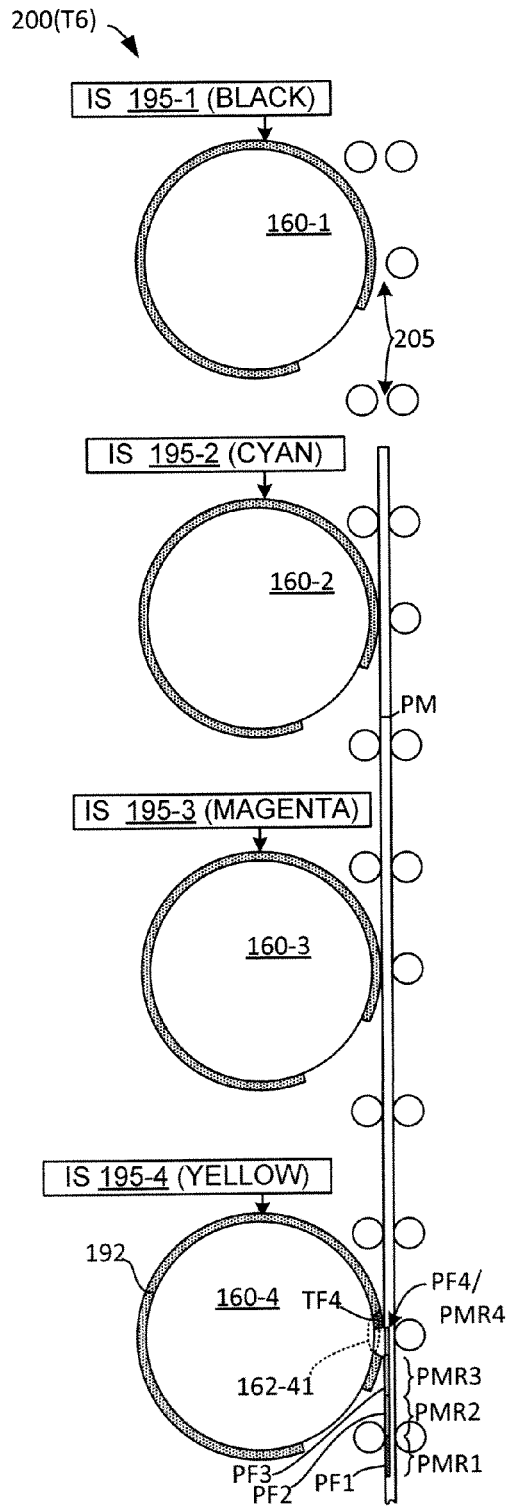

FIG. 8(F) illustrates printing system 200 at a final time T6 when imaging systems 100-1, 100-2 and 100-3 are now essentially deactivated, and print medium PM has moved in feed path 205 such that a fourth targeted print medium region PMR4 is precisely aligned with the transfer point associated with drum cylinder 160-4, causing yellow ink feature TF4 to transfer onto region PMR4 to produce ink "dot" PF4, thereby completing the full color image including black "dot" PF1 in region PMR1, cyan "dot" PF2 in region PMR2, magenta "dot" PF3 in region PMR3, and yellow "dot" PF4 in region PMR4.

As described above, according to the present invention, image server 220 coordinates the movement of the print medium along paper path 205 with a transmission of single-color imaging data portions ID1, 1D2, ID3 and ID4 to imaging systems 100-1, 100-2, 100-3 and 100-4, respectively, such that single-color printing image portions PF1, PF2, PF2 and PF4 are successively transferred in a superimposed manner onto the print medium PM, whereby said full color image FCI is generated on print medium PM e.g., a paper sheet. During this print operation the image server 220 synchronizes the operation of each single-color imaging systems 100-1 to 100-4 using position sensors as described above to accurately measure the displacement of the imaging surface of each imaging cylinder. In one embodiment reflex clocks are generated at the appropriate line clock rate for imaging resolution that also track the motion of imaging cylinders 160-1 to 160-4 such that the single-color image portions formed on the imaging cylinders have accurate line scan positioning (spatial imaging) on their respective imaging surfaces such that transfer to print medium PM is performed precisely. Reflex clock for each color printing station is generated at a higher frequency than the line scan imager line clock rate. Note that the transfer of image data portions ID1 to ID4 are subject to individual print head delays, which are used as actuators to delay a divided down reflex clock to each head module. This allows sub-pixel adjustment of each head timing to align or Y stitch the timing of the linear array of imaging modules such that the placement of pixels being written by the multiple heads are co-linear in the resulting image on the imaging cylinder.

Figure 9:
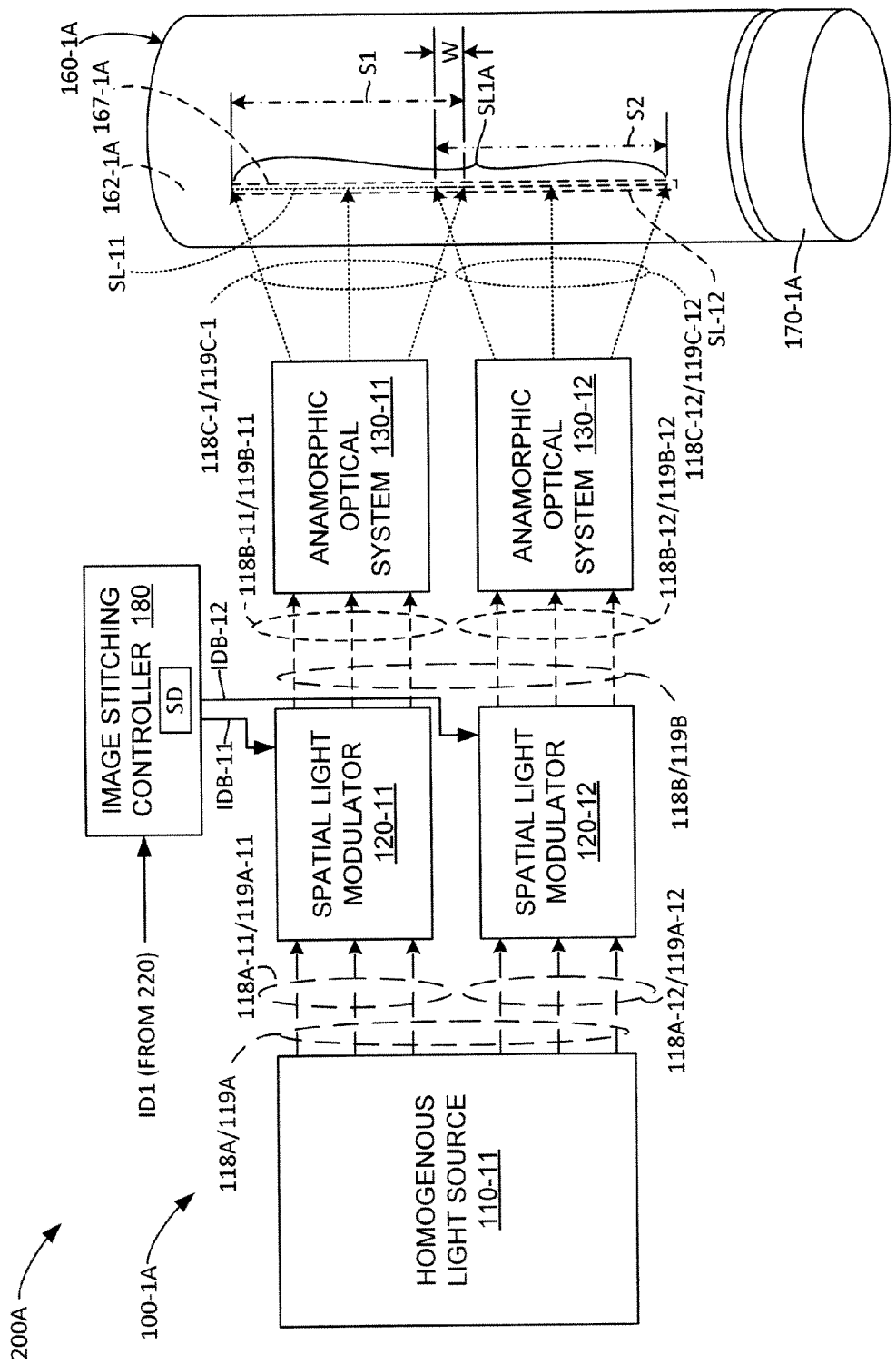
FIG. 9 is a modified block diagram depicting a portion of a single-color imaging apparatus according to another embodiment of the present invention.

FIG. 9 is a "folded-out" diagram showing part of a reflex-type digital offset printing system 200A according to another embodiment of the present invention. In particular, FIG. 9 shows one of four single-pass single-color imaging systems 100-1A of digital offset printing system 200A, which includes three additional single-color imaging systems (not shown) that are substantially arranged in series as indicated in FIG. 1. Similar to the earlier embodiments, imaging system 100-1A includes a homogenous light generator 110-11, an imaging cylinder 160-1A upon which a scan line image SL1A is generated in response to single-color (e.g., black) image data ID1, and a position sensor (e.g., an encoder) 170-1A that functions as described above. Single-pass single-color imaging system 100-1A differs from the previously described embodiments in that it includes at least two spatial light modulators 120-11 and 120-12 and associated anamorphic optical (e.g., projection lens) systems 130-11 and 130-12 disposed, an image stitching controller 180 that serves to modify the received image data IDA in accordance with predetermined stitching data SD, and to produce modified image data groups IDB-11 and IDB-12 that are respectively transmitted to spatial light modulators 120-11 and 120-12, whereby spatial light modulators 120-11 and 120-12 are cooperatively controlled such that a seamless scan line image SL1a is generated in an elongated imaging region 167-1A of scan structure 160-1A. Other than modified operation associated with the stitching function described below, the structure and operation of imaging system 100-1A is essentially identical to the operations described above. Also, although two spatial light modulators 120-11 and 120-12 and associated anamorphic optical systems 130-11 and 130-12 are shown in FIG. 9, any number of such pairs may be utilized using the techniques described below. In addition, anamorphic optical systems 130-11 and 130-12 are represented by blocks for the purposes of simplification in FIG. 9, but are understood to comprise optical elements arranged essentially as set forth above with reference to FIGS. 6(A) and 6(B).

According to the present embodiment, image stitching controller 180 modifies the "raw" black image data ID1 in accordance with predetermined stitching data SD such that, when modified image data group IDB-11 is transmitted to spatial light modulator 120-11 and modified image data group IDB-12 is transmitted to spatial light modulator 120-12, their respective light modulating elements are cooperatively controlled such that the scan line portions SL-11 and SL-12 seamlessly form scan line image SLA in elongated imaging region 167-1A. As discussed above, black image data ID1 consists of a series of electronic bits transmitted from image server 220 (shown in FIG. 1) that are used to generate scan line image SL1A. Image stitching controller 180 utilizes stitching data SD to separates and modifies "raw" image data IDA into two image data groups IDB-11 and IDB-2B such that, when modified image data groups IDB-11 and IDB-2B are transmitted to spatial light modulators 120-11 and 120-2B, they modulate homogenous light 118A such that scan line portions SL-11 and SL-12 collectively form scan line image SL without gaps or overlaps.

According to another aspect of the present embodiment, at least one of spatial light modulators 120-11 and 120-12 and corresponding anamorphic optical systems 130-11 and 130-12 are purposefully arranged to produce an overlapping pattern in imaging region 167-1A of scan structure 160-1A. That is, the components are arranged such that, if all of the modulating elements in spatial light modulators 120-11 and 120-12 were turned "on", the resulting scan line portions SL-11 and SL-12 would overlap on imaging surface 162-1A in region W. In particular, with all modulating elements of adjacent spatial light modulators 120-11 and 120-12 turned "on", the lowermost edge of anamorphically imaged and concentrated light field 119C-11 overlaps the uppermost end of anamorphically imaged and concentrated light field 119C-12, whereby sections of scan line portions SL-11 and SL-12 are simultaneously generated in overlap region W of imaging region 167-1A. This overlapping component arrangement ensures that imaging system 100-1A is able to produce scan line SLA1 without gaps that can be caused when the adjacent anamorphic optical systems 130-11 and 130-12 are placed too far apart during assembly.

According to another aspect of the present invention, image stitching controller 180 serves to electronically correct the above-mentioned intentional overlap condition (and to make additional corrections, if necessary) utilizing predetermined stitching data SD, which is generated after assembly of apparatus 200A by determining the extend of any overlap/ misalignment, and modifying the associated image data using the methods described below to correct the overlap/misalignment. For example, in order to correct the intentional horizontal (scan-wise) overlap condition described above, modified image data groups IBD-11 and IBD-12 are generated such that one or more columns of modulating elements of one or more of spatial light modulators 120-11 and 120-12 are effectively "disabled" (i.e., image data is not sent the these columns, and its modulating elements remain in the "off" modulated state) such that adjacent end portions of scan line portions SL-11 and SL-12 are aligned in the scan direction to produce a seamlessly stitched portion of scan line image SLA. A similar modification may also be used to correct a vertical misalignment between scan line portions SL-11 and SL-12 (i.e., where one scan line is effectively shifted downward). By selectively shifting image data transferred to the spatial light modulators in this way, the resulting scan line portions SL-11 and SL-12 are stitched together and aligned in both the process (Y-axis) and the cross-scan (X-axis) directions to form a seamless elongated scan line image SLA. In addition, once the necessary adjustment is determined during a configuration operation, stitching data SD used by image stitching controller 180 is stored and utilized to effectively eliminate the horizontal/vertical overlap/displacement for all subsequent print/scan operations.

Additional details regarding the stitching arrangement described above with reference to FIG. 9 is provided in co-pending application Ser. No. 13/216,702, entitled SINGLE-PASS IMAGING APPARATUS WITH IMAGE DATA SCROLLING FOR IMPROVED RESOLUTION CONTRAST AND EXPOSURE EXTENT, which is incorporated herein by reference in its entirety.

Although the present invention has been described with respect to certain specific embodiments, it will be clear to those skilled in the art that the inventive features of the present invention are applicable to other embodiments as well, all of which are intended to fall within the scope of the present invention. For example, although the present invention is described with reference to the production of full color images, the reflex-type digital offset printing system and methods described herein may be utilized to correct for out-of round drum defects and drive train defects in printing systems that utilize a single imaging system to produce monochrome images. Referring to FIG. 1, such a monochrome printing system includes only imaging system 100-1, wherein system controller 220 coordinates the transmission of imaging data portion ID to spatial light modulator 120-1 in accordance with cylinder position signal PS-1 from position sensor 170-1 such that successive image portions are transferred onto print medium PM based on the actual drum surface position, thereby producing highly uniform image pixel spacing in the process direction. Moreover, although the present invention is described with reference to a specific embodiment involving a direct-to-paper image transfer from the imaging drum, the present invention may also utilize an offset blanket or offset drum for transferring the image between the imaging drum and the print medium (e.g., a paper sheet). In addition, although the present invention is illustrated as one fold (see FIG. 2), other arrangements may be contemplated by those skilled in the art that include linear light paths or arrangements having folding along any number of arbitrary light paths. Finally, the methods described above for generating a high energy scan line image may be achieved using devices other than those described herein.

The invention claimed is:

1. A reflex-type digital offset printing system for generating a full color image on a print medium in response to image data including a plurality of single-color image data portions, the printing system comprising:
   one or more feed rollers forming a print medium feed path extending in a process direction;
   a plurality of single-color imaging systems arranged in series along the print medium feed path, each of said single-color imaging systems including:
      an imaging cylinder having a cylindrical outer imaging surface;
      a liquid source for applying a fountain solution on the outer imaging surface;
      at least one spatial light modulator including a plurality of light modulating elements arranged in a two-dimensional array and disposed in a two-dimensional homogenous light field such that each said modulating element receives an associated portion of the homogenous light field, wherein each modulating element is individually adjustable between a first modulated state and a second modulated state such that a two-dimensional modulated light field is formed only by said associated portions of the homogenous light field directed onto each said modulating element that is disposed in said first modulated state,
      at least one anamorphic optical system positioned to receive said two-dimensional
   modulated light field, and arranged to concentrate said modulated light field in an elongated scanning region of the outer imaging surface such that the concentrated modulated light portions remove said fountain solution from said elongated scanning region to produce an elongated scan line image that is aligned in a cross-process direction; and
      an ink source for applying an ink material to the outer imaging surface exposed by said elongated scan line image; and
   a system controller for coordinating transmission of said single-color imaging data portions to said spatial light modulators such that single-color image portions are successively transferred in a superimposed manner onto the print medium by the plurality of single-color imaging systems, whereby said full color image is generated on said print medium.

2. The reflex-type digital offset printing system according to claim 1,
   wherein each single-color imaging system of said plurality of single-color imaging systems further comprises a position sensor for generating a cylinder position signal corresponding to a rotational position of the imaging cylinder of said each single-color imaging system, and
   wherein said system controller transmits said single-color imaging data portions in accordance with said cylinder position signals received from said plurality of single-color imaging systems.

3. The reflex-type digital offset printing system according to claim 2, wherein the position sensor of each single-color imaging system comprises one of a rotary shaft encoder and a surface motion encoder.

4. The reflex-type digital offset printing system according to claim 2, wherein the spatial light modulator of each of said single-color imaging systems comprises one of a digital micromirror device, an electro-optic diffractive modulator array, and an array of thermo-optic absorber elements.

5. The reflex-type digital offset printing system according to claim 2,
wherein the spatial light modulator of each of said single-color imaging systems comprises a digital micromirror device (DMD) in which each light modulating element of the plurality of light modulating elements comprises a microelectromechanical (MEMs) mirror mechanism disposed on a substrate, and
wherein each MEMs mirror mechanism includes a mirror and means for supporting and moving the mirror in response to an image data bit, between a first tilted position relative to the substrate, and a second tilted position relative to the substrate.

6. The reflex-type digital offset printing system according to claim 5, wherein each said DMD and an associated said anamorphic optical system of each of said single-color imaging systems are cooperatively positioned such that, when the mirror of each said MEMs mirror mechanism of said each DMD is in the first tilted position, said mirror reflects said associated received light portion to the associated anamorphic optical system, and when said mirror of each said MEMs mirror mechanism is in the second tilted position, said mirror reflects said associated received light portion away from the associated anamorphic optical system.

7. The reflex-type digital offset printing system according to claim 5,
wherein the plurality of MEMs mirror mechanisms of each said DMD are arranged in a plurality of rows and a plurality of columns, wherein each said column includes an associated group of said plurality of MEMs mirror mechanisms, and
wherein the anamorphic optical system is arranged relative to a corresponding MEMs mirror mechanism such that modulated light portions received from each associated group of said plurality of MEMs mirror mechanisms of each said column are concentrated onto an associated line image region of said elongated line image.

8. The reflex-type digital offset printing system according to claim 7, wherein the anamorphic optical system of each of the plurality of single-color imaging systems comprises:
a cross-process optical subsystem positioned to receive the two-dimensional modulated light field and to image the two-dimensional modulated light field in the cross-process direction, and
a process-direction optical subsystem including said at least one at least one optical element, said process-direction optical subsystem being disposed between said cross-process optical subsystem and said imaging surface.

9. The reflex-type digital offset according to claim 8,
wherein the liquid source of each single-color imaging system is positioned to apply said fountain solution at a first radial position of the imaging cylinder onto the outer imaging surface,
wherein the spatial light modulator and anamorphic optical system of each single-color imaging system are arranged to direct said concentrated modulated light portions in said elongated scanning region at a second radial position of the imaging cylinder that is downstream from the first radial position, and
wherein the ink source of each single-color imaging system is positioned to apply said ink material at a third radial position of the imaging cylinder onto the portions of the outer imaging surface exposed by said elongated scan line image, the third radial position being downstream from the second radial position.

10. The reflex-type digital offset according to claim 9, wherein the ink material is formulated such that the ink material adheres only to exposed portions of the imaging surface from which the fountain solution has been removed by said concentrated modulated light portions, whereby the ink material forms a single-color image portion on the exposed portions of the imaging surface.

11. The reflex-type digital offset according to claim 10, wherein the outer imaging surface of the imaging cylinder of each single-color imaging system intersects the print medium feed path at a fourth radial position of the imaging cylinder that is downstream from the ink source such that said single-color image portion is transferred from the imaging cylinder to said print medium.

12. The reflex-type digital offset according to claim 11, wherein the plurality of single-color imaging system comprise:
a first single-color imaging system disposed at a first position of the print medium feed path;
a second single-color imaging system disposed at a second position of the print medium feed path, the second position being downstream from the first position;
a third single-color imaging system disposed at a third position of the print medium feed path, the third position being downstream from the second position; and
a fourth single-color imaging system disposed at a fourth position of the print medium feed path, the fourth position being downstream from the third position.

13. The reflex-type digital offset according to claim 12,
wherein the ink source of the first single-color imaging system includes a black ink material,
wherein the ink source of the second single-color imaging system includes a cyan ink material,
wherein the ink source of the third single-color imaging system includes a magenta ink material, and
wherein the ink source of the fourth single-color imaging system includes a yellow ink material.

14. The reflex-type digital offset according to claim 1,
wherein each of the a plurality of single-color imaging systems comprises a plurality of said spatial light modulators, each including an associated plurality of light modulating elements, and
wherein each single-color imaging system further comprises an image stitching controller for modifying said single-color image data in accordance with predetermined stitching data such that, when said modified image data is transmitted to said plurality of spatial light modulators, said plurality of light modulating elements of all of said plurality of spatial light modulators are cooperatively controlled such that the scan line portions collectively form said scan line image in the elongated imaging region.

15. The reflex-type digital offset according to claim 1, wherein the imaging cylinder is arranged such that the cylindrical outer imaging surface extends into a corresponding portion of the print medium feed path.

* * * * *